United States Patent

Inoue et al.

[11] Patent Number: 5,764,397
[45] Date of Patent: Jun. 9, 1998

[54] OPTICAL SCANNER

[75] Inventors: Nozomu Inoue; Yujiro Nomura; Takashi Hama; Kyu Takada, all of Nagano, Japan

[73] Assignee: Seiko Epson Corporation, Tokyo, Japan

[21] Appl. No.: 755,013

[22] Filed: Nov. 22, 1996

[30] Foreign Application Priority Data

Nov. 24, 1995 [JP] Japan .................................. 7-306197
Aug. 21, 1996 [JP] Japan .................................. 8-220195

[51] Int. Cl.$^6$ .................................................. G02B 26/08
[52] U.S. Cl. ............................................ 359/216; 359/217
[58] Field of Search ........................... 359/212, 216–219; 250/234–236; 347/258–261

[56] References Cited

U.S. PATENT DOCUMENTS

| | | | |
|---|---|---|---|
| 4,030,806 | 6/1977 | Goshima et al. | 359/217 |
| 5,392,149 | 2/1995 | Boardman et al. | 359/216 |
| 5,557,438 | 9/1996 | Schwartz et al. | 359/205 |

FOREIGN PATENT DOCUMENTS

| | | | |
|---|---|---|---|
| 51-32340 | 3/1976 | Japan | G02B 27/17 |
| 51-100742 | 9/1976 | Japan | G02B 27/00 |

Primary Examiner—James Phan
Attorney, Agent, or Firm—Sughrue, Mion, Zinn, Macpeak & Seas, PLLC

[57] ABSTRACT

An optical scanner comprises: a light source; beam shaping optics for transforming an optical beam from the light source into a convergent beam; a rotating polygonal mirror having at least a first reflecting face for deflecting the convergent beam and a second reflecting face; and transmission optics having a lens, with which the optical beam deflected by the first reflecting face of the rotating polygonal mirror is allowed to be incident on the second reflecting face of the rotating polygonal mirror, with the optical beam incident on the second reflecting face of the rotating polygonal mirror being deflected therefrom to produce a scanning optical beam which scans a predetermined surface to be scanned, wherein the convergent optical beam forms a focused image at a point located between the first reflecting face of the rotating polygonal mirror and the lens in the transmission optics.

10 Claims, 11 Drawing Sheets

OPTICAL SCANNER

BACKGROUND OF THE INVENTION

The present invention relates to an optical scanner for use with laser beam printers and it relates particularly to optics which causes an optical beam to be incident twice on reflecting faces of a rotating polygonal mirror.

Optical scanner are used with image recording apparatus such as a laser beam printer and various types of image reading and measuring apparatus. To deflect an optical beam for scanning purposes, a rotating polygonal mirror is commonly employed as a deflector.

In the apparatus described above, two-dimensional scanning is performed in such a way that an optical beam is moved repeatedly by the optical scanner to trace a straight or curved line on the surface to be scanned whereas the medium to be scanned which is located on the surface is subjected to a relative movement in a direction generally perpendicular to the scanning direction of the optical beam. For the purpose of the following description, the direction of scanning with the optical scanner shall be defined as "the main scanning direction" whereas the direction of the relative movement of the medium to be scanned shall be defined as "the sub-scanning direction".

In order to achieve better resolution and higher processing speed, recent models of the apparatus described above require faster optical scanners. To ensure that an optical scanner using a rotating polygonal mirror for optical beam deflection has an increased scanning speed (or scanning frequency), the following two methods may be employed:

(1) increasing the rotational speed of the polygonal mirror: or
(2) increasing the number of reflecting faces of the polygonal mirror.

In order to increase the rotational speed of the polygonal mirror, a bearing capable of fast rotation is necessary but ball bearings which are used most commonly today cannot be rotated faster than about 20,000 rpm (rotations per minute). Air bearings can be rotated faster than 30,000 rpm but their price is so high that they can be used with only limited types of apparatus and are not certainly applicable to inexpensive laser beam printers for consumer use.

On the other hand, increasing the number of reflecting faces of the polygonal mirror results in a smaller angle through which one reflecting face rotates. In order to ensure that individual reflecting faces have a certain minimum size, the diameter of the polygonal mirror must be increased.

The common way to operate the optical scanner is by causing an optical beam to form a focused image on the surface to be scanned. In laser beam scanning, the formation a small focused beam spot requires that the individual reflecting faces of the polygonal mirror have a certain size in the main scanning direction as determined by the divergent angle of the laser beam. However, if the number of the reflecting faces is increased, the angle through which an individual reflecting face rotates is decreased, and so is the scanned angle of the optical beam. If the scanned angle of the optical beam is small, the focal length of the scanning optics that is required to provide a specified scan width is increased, causing a corresponding increase in the optical path-length from the polygonal mirror to the surface to be scanned. As a result, the optical beam on a reflecting face of the polygonal mirror will have an increased diameter in the main scanning direction and, compared to the case where the polygonal mirror has less reflecting faces, the size of the reflecting faces will increase, which causes a further increase in the size of the polygonal mirror.

In other words, as the number of reflecting faces of the polygonal mirror increases, the required size of the reflecting faces will increase rather than decrease. Because of this nature of the polygonal mirror, the upper limit of the number of reflecting faces is determined if the size of the polygonal mirror (or the cylinder inscribed in the mirror) is determined. Consider, for example, an optical scanner for use with a laser beam printer; if the required scan width is 350 mm at a wavelength of 780 nm and if the inscribed cylinder of the rotating polygonal mirror has a radius of 25 mm to produce a spot diameter of no more than 50 µm in the main scanning direction on the surface to be scanned, the number of reflecting faces of the polygonal mirror cannot generally be greater than seven.

If the diameter of the polygonal mirror is increased with a view to ensuring an increased number of reflecting faces, the weight and secondary momentum of inertia of the polygonal mirror increase and so does the air resistance (windage loss) caused by the rotation of the polygonal mirror, which limits the rotating speed of the polygonal mirror to a low rpm.

Given these limitations on the number of reflecting faces of the polygonal mirror and its rotating speed, various scanners have heretofore been proposed in order to achieve scanning speeds that can overcome those difficulties.

One proposal is described in Japanese Patent Application Laid-open (kokai) No. Sho. 51-100742 and it is characterized by using a semiconductor laser array as a light source such that the surface of interest is scanned with a plurality of laser beams simultaneously to thereby achieve a higher scanning speed. According to this method, there is no need to increase the rotating speed of the polygonal mirror and yet the scanning speed can be increased by a factor corresponding to the number of lasers integrated on the device.

Another proposal is described in Japanese Patent Application Laid-open (kokai) No. Sho. 51-32340, according to which an optical beam from a light source is allowed to be incident on the rotating polygonal mirror such that it forms a very small diameter of beam spot in the main scanning direction whereas the deflected optical beam is allowed to be incident again on the polygonal mirror via transmission optics. Thus, the optical beam is allowed to be incident twice on the rotating polygonal mirror.

In the second approach, the optical beam which is allowed the first incidence on the rotating polygonal mirror forms a beam spot of a very small diameter compared to the optical beam that is allowed the second incidence and, in addition, the transmission optics is adapted such that the optical beam which is allowed to be incident on a reflecting face of the polygonal mirror the second time will track the center of the reflecting surface in the main scanning direction.

With this arrangement, the diameter of the optical beam that is first allowed to be incident on the rotating polygonal mirror can be reduced to such a small level that it is possible to scan over an area that is equivalent to the angle subtended by each reflecting face of the polygonal mirror. When the optical beam deflected by the first reflecting face of the polygonal mirror passes through the transmission optics to be incident on the rotating polygonal mirror the second time, the diameter of the optical beam is increased to the value necessary to form a specified beam spot on the surface to be scanned; however, since the second incidence of the optical beam follows the rotation of the reflecting face, the size of the optical beam can be set at a value independent of the angle through which the polygonal mirror rotates.

The first problem to be solved by the invention will now be described.

The method of simultaneous scanning with a plurality of optical beams as proposed in Japanese Patent Application Laid-open No. Sho. 51-100742, has various problems resulting from the need to ensure that a plurality of light sources will emit the same quantity of light or specified amounts of light, the need to start scanning-associated modulation in a timed relationship for the respective light sources, and the need to ensure that the plurality of optical beams will draw parallel scanning lines at specified spacings. Obviously, an optical scanner that can solve these problems will have a design more complicated and difficult than the usual model.

In the other conventional method which allows an optical beam to be incident twice on the rotating polygonal mirror, the optical beam that is first allowed to be incident on the polygonal mirror has such a small diameter in the main scanning direction that it may be affected by any flaws or dust particles on the reflecting faces of the polygonal mirror and thereby fail to form a focused beam spot on the surface to be scanned.

Further referring to this second approach, FIG. 11 shows a cross section, taken in the main scanning plane, of the area of the polygonal mirror extending from the first reflecting face to the second reflecting face. For the purposes of the present discussion, the "main scanning plane" (or the "main scanning cross section") is defined as a plane crossing the axis of rotation of the polygonal mirror at right angles whereas the "sub-scanning plane" (or the "sub-scanning cross section") shall be defined as a plane that is parallel to the axis of rotation of the polygonal mirror and which includes the optical axis.

The optical beam from a light source is focused on the first reflecting face 31 of the rotating polygonal mirror and deflected as a divergent beam. The transmission optics comprises a single transmission lens element 141, which is positioned away from the reflecting face 31 by a distance equal to the focal length f of the lens. Therefore, the deflected optical beam is collimated by passage through the transmission lens 141 and thereafter travels as parallel rays of light.

As already mentioned, the transmission lens 141 forming the transmission optics is positioned away from the first reflecting face 31 by a distance equal to the focal length of the lens. To provide ease in manufacture, the focal length of the transmission lens is preferably increased by positioning it further away from the first reflecting face. Another reason why the transmission lens is preferably positioned remote from the polygonal mirror is the convenience in the lens to optical axis layout around the polygonal mirror.

If the inscribed cylinder of the polygonal mirror has a radius of R, the amount of movement of each reflecting face due to the rotation of the polygonal mirror by an angle of $\theta 1$ can be approximated by $R \cdot \theta 1$. Let this amount be written as $\delta$; in order to ensure that the optical beam deflected by the first reflecting face 31 through an angle of $2 \cdot \theta 1$ will follow the movement $\delta$ of the second reflecting face 32, the focal length f of the lens 141 must be equal to $\delta/(2 \cdot \theta 1)$. As already mentioned, the primary purpose of the second approach is to ensure that the radius R of the inscribed cylinder of the polygonal mirror is kept relatively small and yet provide the polygonal mirror with a maximum number of reflecting faces; hence, the amount of movement $\delta$ of each reflecting face also takes a relatively small value. As a result, the focal length f of the transmission lens 141 becomes very small, introducing considerable difficulty in lens design and manufacture. In addition, the transmission lens 141 is located near the first reflecting face 31 and this also introduces difficulty in the layout of optics around the reflecting faces of the polygonal mirror.

Consider here the case where an optical beam deflected by the first reflecting surface of the polygonal mirror through an angle of $2 \cdot \theta 1$ is reflected by a plane mirror. Since the deflected optical beam is also incident on the second reflecting face at the same angle of $2 \cdot \theta 1$, the optical beam can eventually be scanned at an angle of $4 \cdot \theta 1$. In other words, the scanned angle is doubled by allowing the optical beam to be incident twice on the polygonal mirror.

However, in the second conventional method under consideration, the deflection by the first reflecting face 31 causes a parallel shift in the optical beam which is incident on the second reflecting face 32, so the final scanned angle of the optical beam is no more than twice the angle $\theta 1$ through which the polygonal mirror rotates and the dual incidence of the optical beam on the polygonal mirror is no longer effective in amplifying the scanned angle. As a result, the focal length of the scanning optics in the main scanning plane is increased, making it impossible to prevent the scanning optics from becoming unduly long.

In addition to this problem, if the rotating angle $\theta 1$ of the polygonal mirror is decreased while maintaining the same scan width, the scanned angle $(2 \cdot \theta 1)$ is also decreased, causing a progressive increase in the focal length of the scanning optics. It should also be noted that on the first reflecting face, the decreasing $\theta 1$ will result in the increasing margin of the reflecting face whereas on the second reflecting face, the diameter of the optical beam in the main scanning direction will increase to reduce the margin of the reflecting face. Therefore, the only method that can be taken is to maximize the value of $\theta 1$ to the extent that is tolerated by the margin of the first reflecting face and there is no design latitude at all in the paraxial parameters of both transmission and scanning optics.

With a view to avoiding this difficulty, it has been proposed that a collimated optical beam be incident on the first reflecting face and that the transmission optics be designed as afocal optics. However, due to the comparatively small diameter of the parallel light beam incident on the first reflecting face, the composition of the beam shaping optics becomes inevitably complicated.

The second problem to be solved by the present invention is now described. In the first conventional method which performs simultaneous scanning with a plurality of optical beams, the optical scanner that is required will obviously have a considerably complicated design compared to the usual model, as already pointed out above in connection with the first problem to be solved by the invention.

In contrast, the second conventional art method which allows an optical beam to be incident twice on the rotating polygonal mirror has the advantage of requiring a comparatively simple electric circuit since scanning is performed with a single light source. In this conventional art technique, the optical beam has a very small diameter in the main scanning direction at the point of time when it is incident on the first reflecting face of the rotating polygonal mirror and its diameter is enlarged with the transmission optics such that it follows the rotational movement of the second reflecting face of the polygonal mirror. After being deflected by the second reflecting face, the optical beam is passed through the scanning optics to scan over the target surface.

When the optical beam that has been once deflected by the rotating polygonal mirror is allowed to be incident again on the polygonal mirror, namely, to follow the second reflecting face, the transmission optics can be adapted to produce a lateral magnification such that the angle of incidence of the optical beam will increase with respect to the second reflecting face. To be more specific, when the polygonal mirror rotates by an angle of θ1, the angle at which the optical beam is incident on the second reflecting face of the rotating polygonal mirror increases by θ1 plus θ2 which is the angle of deviation of the optical beam introduced by the transmission optics. Conversely, if the angle of incidence decreases by θ1, the angle of deviation θ2 also decreases.

Therefore, the scanned angle θs of the optical beam deflected by the second reflecting face is equal to 2·θ1+2. In other words, the scanned angle is amplified compared to the value θs=2·θ1 which is obtained in the case where the optical beam is deflected by single incidence on the rotating polygonal mirror.

Speaking of the optical path-length of the scanning optics, its focal length fs in the main scanning direction has to be made as short as possible in order to minimize its optical path-length. Given a required scan width Y, the scanned angle θs must be increased in order to reduce the focal length fs.

It should be noted here that the scan width Y consists of not only the width of the effective region on the surface to be scanned but also the distance from a point on the surface to a beam detector positioned ahead of the effective scan region. Before the optical beam scans over the effective scan region, a light source is lit for a specified time and the produced optical beam is directed to the beam detector, which generates a sync signal providing a reference point for scanning.

As is clear from the equation set forth above, the value of θ1 or θ2 must be increased in order to increase θs. Theoretically, θ1 cannot be greater than the value obtained by dividing 360° (the angle of one rotation) by the number of reflecting faces of the polygonal mirror. In practice, the optical beam on each reflecting face has a finite size and the individual reflecting faces require a certain amount of margin since they cannot be utilized up to the geometric limits. These factors further reduce θ1 to a smaller value in practical applications.

The ratio between θ1 and θ2 is determined by the lateral magnification β produced by the transmission optics and the value of this lateral magnification β is equal to the ratio in size between the optical beam on the first reflecting face and that on the second reflecting face. Therefore, if either θ1 or θ2 is increased, the diameter of the optical beam will increase on either the first or second reflecting face and the size of these reflecting faces provides a constraint.

Conventionally, the geometric size of each reflecting face of the polygonal mirror in the main scanning direction has been determined by allowing various margins with respect to the size of the optical beam on each reflecting face and the amount of its movement on the reflecting face. Typical margins correspond to the following factors: (i) the area of nonuse created by the chamfering (or rounding) of each boundary between adjacent reflecting faces; (ii) the area of nonuse created near each boundary between adjacent reflecting faces due to "sag" in machining; and (iii) the positional error in the center of rotation of the polygonal mirror with respect to the optical axis.

These factors must also be taken into consideration in the case where the optical beam is allowed to be incident twice on the rotating polygonal mirror. However, if one wants to ensure an adequate margin on both the first and second reflecting faces and yet provide a wide scanned angle θs, the size of the polygonal mirror will inevitably increase.

A further problem occurs in this conventional art technique due to the fact that the optical beam incident on the first and second reflecting faces has an angle with the normal direction in the main scanning plane. That is, the incident optical beam is projected onto the reflecting faces having a greater diameter than in the case of normal incidence, thus requiring a corresponding increase in the size of the reflecting faces.

SUMMARY OF THE INVENTION

The present invention has been accomplished under these circumstances and according to its first aspect, the invention has as an object providing an optical scanner that permits an optical beam to be incident on a rotating polygonal mirror twice to perform deflection and which yet is immune to the effects of flaws or dust buildup on the reflecting faces of the polygonal mirror.

Another object of the first aspect of the invention is to provide an optical scanner that permits ease in the manufacture of the transmission lenses in transmission optics and which can realize compact scanning optics.

According to its second aspect, the present invention has as an object providing an optical scanner that is capable of producing a large scanned angle with a rotating polygonal mirror the inscribed circle of which has a small diameter.

The objects of the first aspect of the invention can be attained by an optical scanner which comprises a light source, beam shaping optics for transforming an optical beam from the light source into a convergent beam, rotating polygonal mirror having at least a first reflecting face for deflecting the convergent beam and a second reflecting face, and transmission optics with which the optical beam deflected by the first reflecting face of the rotating polygonal mirror is allowed to be incident on the second reflecting face of the rotating polygonal mirror and in which the optical beam incident on the second reflecting face of the rotating polygonal mirror is deflected therefrom to produce a scanning optical beam which scans a predetermined surface to be scanned, wherein the convergent optical beam forms a focused image at a point located between the first reflecting face of the rotating polygonal mirror and the first lens in the transmission optics.

In a preferred embodiment, the optical scanner has a β value of 2 to 20, with β being equal to θ1 times two divided by θ2, where θ1 is the angle of rotation of the polygonal mirror in the case where the scanning optical beam is positioned the farthest from the optical axis and θ2 is the angle of deflection which the optical beam from the transmission optics forms with the optical axis when it is incident again on the polygonal mirror as it is rotating by the angle θ1.

In another preferred embodiment, in the optical scanner, during the time period for which the scanning optical beam scans over a predetermined region, the geometric size of the second reflecting face minus wo' is adjusted to be greater than the geometric size of the first reflecting face minus wi' and E, where wi' is a maximum value which the diameter of the convergent optical beam as measured in a plane crossing the axis of rotation of the rotating polygonal mirror at right angles, will take when the optical beam is incident on the first reflecting face of the rotating polygonal mirror, wo' is a maximum value which the diameter of the optical beam from the transmission optics, as measured in a plane crossing the axis of rotation of the rotating polygonal mirror at right angles, will take when the optical beam is incident on the second reflecting face of the rotating polygonal mirror, and E is the distance over which the convergent optical beam moves on the first reflecting face during the time period for which the scanning optical beam scans over a predetermined range.

In yet another preferred embodiment, the transmission optics is composed of a single lens element.

The object of the second aspect of the invention can be attained by an optical scanner which comprises a light source, beam shaping optics for transforming an optical beam from the light source into a predetermined shaped optical beam, a rotating polygonal mirror having at least a first reflecting face for deflecting the shaped optical beam and a second reflecting face, and transmission optics with which the optical beam deflected by the first reflecting face of the rotating polygonal mirror is allowed to be incident on the second reflecting face of the rotating polygonal mirror, and in which with incident on the second reflecting face of the rotating polygonal mirror is deflected therefrom to produce a scanning optical beam which scans a predetermined surface to be scanned, wherein during the time period for which the scanning optical beam scans over a predetermined region, the geometric size of the second reflecting face minus wo' is adjusted to be greater than the geometric size of the first reflecting face minus wi' and E, where wi' is a maximum value which the diameter of the shaped optical beam, as measured in a plane crossing the axis of rotation of the rotating polygonal mirror at right angles, will take when the shaped optical beam is incident on the first reflecting face of the rotating polygonal mirror, wo' is a maximum value which the diameter of the optical beam from the transmission optics, as measured in a plane crossing the axis of rotation of the rotating polygonal mirror at right angles, will take when the optical beam is incident on the second reflecting face of the rotating polygonal mirror, and E is the distance over which the shaped optical beam moves on the first reflecting face during the time period for which the scanning optical beam scans over a predetermined range.

In a preferred embodiment, the angle at which the shaped optical beam is incident on the first reflecting face when the scanning optical beam scans near the center of the predetermined range is perpendicular to the first reflecting face in the main scanning plane.

Alternatively, the angle at which the optical beam emerging from the transmission optics and incident on the second reflecting face when the scanning optical beam scans near the center of the predetermined range is perpendicular to the second reflecting face in the main scanning plane.

In another preferred embodiment, the light source is a semiconductor laser which emits visible laser light at a wavelength no longer than 700 nm.

DETAILED DESCRIPTION OF THE PREFERRED EMBODIMENTS

Figure 1:
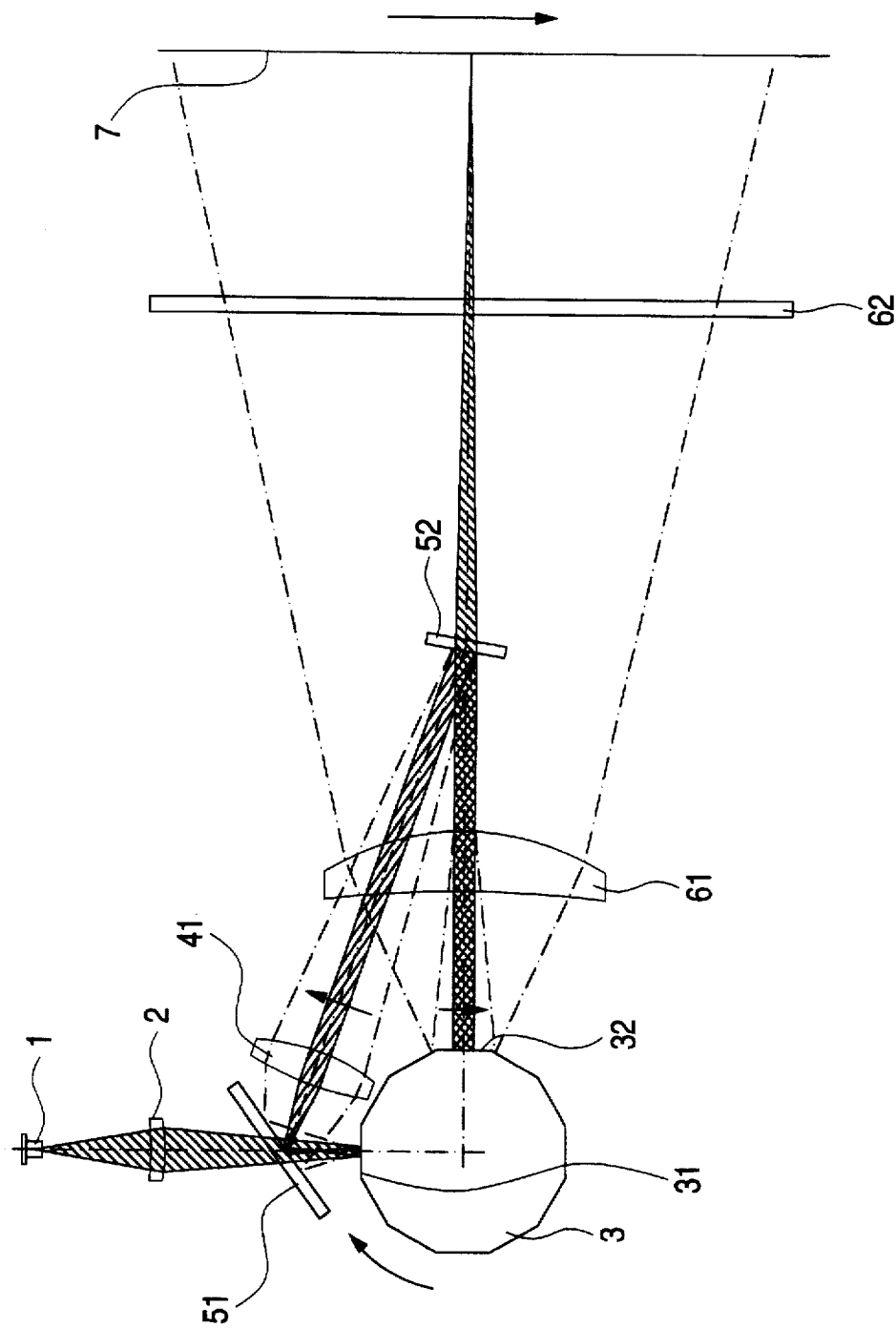
FIG. 1 is a plan view of an optical scanner according to the first embodiment of the present invention as it is seen in the main scanning plane.

FIG. 1 is a plan view of an optical scanner according to the first embodiment of the present invention as it is seen through the main scanning cross section. A semiconductor laser 1 is used as a light source and a laser beam issuing as divergent light from the source is shaped to a convergent optical beam by means of collimator lens 2. The convergent optical beam is incident on the first reflecting face 31 of a rotating polygonal mirror 3. The optical beam deflected by the first reflecting face 31 is reoriented by reflector mirror 51 and becomes convergent before it is admitted into a transmission lens 41 forming transmission optics 4. The optical beam emerging from the transmission lens 41 is substantially parallel and has its optical axis reoriented by reflector mirror 52 before it is incident on the second reflecting face 32 of the rotating polygonal mirror 3. As the result of deflection by the first reflecting face 31, the optical beam incident on the second reflecting face 32 has its center moved such as to follow the center of the second reflecting face 32. The optical beam as deflected by the second reflecting face 32 passes through a scanning lens 61 and a compensator lens 62 to be shaped to a convergent optical beam, which then forms a focused image on a surface to be scanned 7. The scanning lens 61 and the compensator lens 62 combine to make up scanning optics, with which an optical beam that is scanned at a generally uniform angular velocity is allowed to scan over the surface 7 at a uniform linear speed.

In FIG. 1, the optical axis of the beam 1 incident on the first reflecting face 31 is shown to overlap the optical axis of the deflected beam on the paper but, in fact, the two optical axes are spaced apart and inclined with respect to each other in the sub-scanning plane, i.e., in a direction normal to the paper. Similarly, the optical axis of the beam incident on the second reflecting face 32 and the optical axis of the deflected beam are inclined with respect to each other in a plane including the axis of rotation of the polygonal mirror.

In addition, the optical beams to be incident on the first reflecting face 31 and the second reflecting face 32 are adapted to be such that they make normal incidence on the respective reflecting faces in the main scanning plane when the point of incidence is near the optical axis (the center of scanning).

The action of the transmission optics in the optical scanner according to the first embodiment of the invention will now be described in detail. The transmission optics in the optical scanner described above with reference to FIG. 1 is straightened out along the optical path including the reflector mirrors 51 and 52 and shown in the main scanning cross section in FIG. 2.

The optical beam incident on the first reflecting face 31 has a diameter of wi on this reflecting face. After forming a focused image at point P, the optical beam passes through the transmission lens 41 to be transformed to a parallel beam having a diameter of wo. Hence, the distance from the transmission lens 41 to point P is equal to the focal length of the lens 41.

If the polygonal mirror 3 rotates by an angle of $\theta_1$, the optical beam incident on the first reflecting face 31 is deflected by twice the angle $\theta_1$. The deflected optical beam passes through the transmission lens 41 to be further deflected by an angle of $\theta_2$. This optical beam crosses the optical axis at point Q. Thereafter, the optical beam is incident on the second reflecting face 32 and at this point of incidence, the distance between the deflected optical beam and the optical axis is equal to $\delta$ by which amount each reflecting face moves when the polygonal mirror 3 rotates by the angle $\theta_1$.

In this case, the deflected optical beam is further deflected in such a direction that the angle of incidence on the second reflecting face increases by the angle $\theta_2$, so the optical beam reflected from the second reflecting face will be deflected by $2\cdot\theta_1+\theta_2$. In other words, the angle of deflection of the optical beam can be increased by $\theta_2$ compared to the usual system in which the optical beam is incident on the rotating polygonal mirror only once.

The deflected optical beam passing through the transmission lens 41 has its deflection angle changed from $2\cdot\theta_1$ to $\theta_2$, so the magnification $\beta$ is expressed by $2\cdot\theta_1/\theta_2$. Optical geometry states that the relationship expressed by Equation 1 (see below) will hold among the distance (S1) from a point of deflection H on the first reflecting face 31 to the transmission lens 41, the distance (S2) from the transmission lens 41 to point Q at which the deflected optical beam crosses the optical axis, and the focal length (f) of the transmission lens 41. Since the deflection point H is in the object space with respect to the transmission lens 41, the distance S1 takes a negative value.

$$-\frac{1}{S1}+\frac{1}{S2}=\frac{1}{f} \qquad \text{(Eq. 1)}$$

The height of the intercept of the deflected optical beam at the transmission lens 41 is related to the angle of deflection by:

$$2\cdot\theta_1\cdot S1=\theta_2\cdot S2 \qquad \text{(A)}$$

The diameter (wi) of the optical beam incident on the first reflecting face 31 and the diameter (wo) of the parallel optical beam emerging from the transmission lens 41 are related to each other by Equation 2:

$$\frac{wi}{wo}=\frac{S1-f}{f} \qquad \text{(Eq. 2)}$$

Substituting Eq. 1 and Eq. A into Eq. 2, one can see that the ratio of wo to wi for the optical beam is equal to $\beta$, or the ratio of $2\cdot\theta_1$ to $\theta_2$. The value of $\beta$ represents the lateral magnification produced by the transmission optics and it is expressed by the following Equation 3:

$$\beta=\frac{2\cdot\theta_1}{\theta_2}=\frac{wo}{wi} \qquad \text{(Eq. 3)}$$

Thus, the magnitude of $\theta_2$ relative to $2\cdot\theta_1$ can be increased by increasing wi, or the diameter of the optical beam on the first reflecting face, relative to wo, or the diameter of the deflected optical beam emerging from the transmission lens 41.

Referring now to the amount by which the deflected optical beam is displaced from the optical axis at the second reflecting face 32 is expressed paraxially by the distance S3 from the point of intersection Q to the second reflecting face 32 multiplied by angle $\theta_2$, and this displacement is equal to $\delta$, or the amount of movement of the second reflecting face. Thus, $$\theta_2\cdot S3=\delta \qquad \text{(B)}$$

If the distance from the first reflecting face 31 to the second reflecting face 32 is written as L, the following relationship holds:

$$L=S1+S2+S3 \qquad \text{(C)}$$

Therefore, given L, $\delta$ (the amount by which the optical beam follows the movement of the second reflecting face), $\theta_1$ (the angle of rotation of the polygonal mirror) and $\theta_2$ (the corresponding angle of deflection of the optical beam emerging from the transmission optics 41), the focal length (f) of the transmission optics is determined from Eqs. 1, A, B and C.

Figure 2:
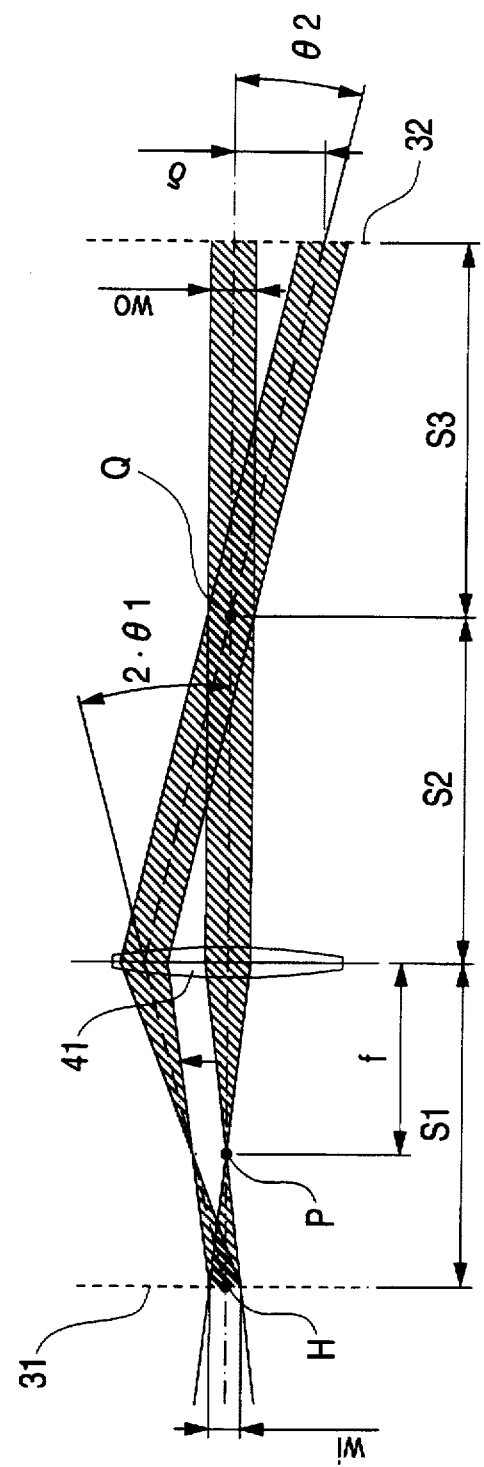
FIG. 2 is a cross section of the optical scanner according to the first embodiment as it is straightened out along the optical path including the first and second reflecting faces of the rotating polygonal mirror and shown in the main scanning plane.
Figure 11:
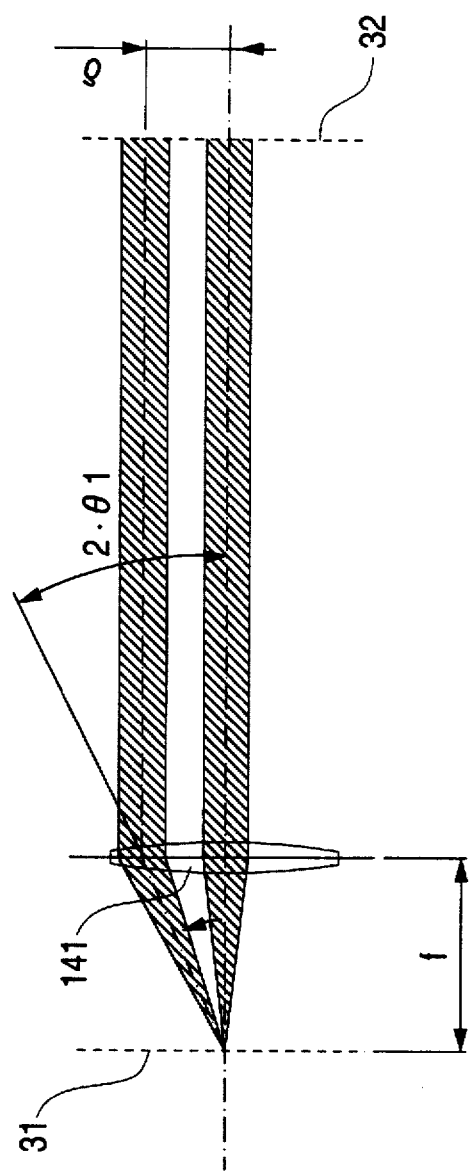
FIG. 11 is a cross section of the conventional art optical scanner as it is straightened out along the optical axis including the first and second reflecting faces of the rotating polygonal mirror.

Suppose here that two optical scanners are fabricated under the same conditions, except that one adopts the conventional art system illustrated in FIG. 11 and the other in accordance with the first embodiment of the present invention illustrated in FIG. 2. The characteristics of the two systems may be compared as follows.

Assume first that the rotating polygonal mirror has 12 reflecting faces and that the inscribed circle of the mirror has a radius (R) of 25 mm. The light source is a semiconductor laser emitting at a wavelength ($\lambda$) of 780 nm. The optical beam emerging after the second incidence on the rotating polygonal mirror 3 is required to scan over a range (Y) of 330 mm, producing a spot size (dO) of 50 µm in the main scanning direction on the surface to be scanned. The on-axis distance L from the first reflecting face of the rotating polygonal mirror to the second reflecting face is 300 mm.

If the optical scanners under consideration are to be used with image recording or inputting apparatus, means for generating sync signals that serve as reference points for successive scanning cycles is necessary. Although not shown in FIG. 1, an optical beam is directed to a beam detector position ahead of the position where the effective scanning region of the target surface is to be scanned and the entering optical beam is converted to an electric signal, thereby producing a sync signal. The beam detector is not necessarily on the surface to be scanned. It should, however, be noted that the range Y which is required to be scanned with the optical scanners extends from the position where the beam detector is provided to the rear end of the effective scanning region.

Write fs for the focal length, in the main scanning direction, of the scanning optics which causes the scanning optical beam leaving the second reflecting face to form a focused image on the surface to be scanned. With so-called "fθ" optics which allows an imaging spot to be located on the surface to be scanned at position y the departure of which from the optical axis is proportional to the scanned angle θ of the optical beam, the relationship y=fs·θ holds. Using the relevant parameters discussed above, one can determine fs by Equation 4:

$$fs = \frac{y/2}{2 \cdot \theta 1 + \theta 2} \quad \text{(Eq. 4)}$$

If a Gaussian beam is assumed, its characteristics dictate that wo, or the diameter of the parallel optical beam admitted into the scanning optics and dO, or the spot size on the surface to be scanned are related by the following Equation 5:

$$wo = \frac{4\lambda}{\pi do} \cdot fs \quad \text{(Eq. 5)}$$

Hence, if fs and dO are known, wo can be determined by Eq. 5.

We next discuss the size of the optical beam on each reflecting face and the size of the latter. The size of each reflecting face is defined as its "geometric size". The geometric size W of each reflecting face is expressed by W=2R·tan (2π/2n), where R is the radius of the inscribed circle (cylinder) of the rotating polygonal mirror and n is the number of its reflecting faces. Hence, the geometric size of each reflecting face represents the distance between apexes of a geometric equilateral polygon without excluding those peripheral portions which are unusable due to machining errors and various other reasons.

With the geometric size W of each reflecting face being thusly defined, let us consider the margin for the size of the optical beam incident relative to W. The point of incidence of the optical beam on the first reflecting face is fixed but due to the rotation of the polygonal mirror, the optical beam makes a relative movement on the first reflecting face. When the scanning optical beam scans over the predetermined range Y through an angle twice the angle θ1 by which the polygonal mirror rotates, the optical beam incident on the first reflecting face will make a relative movement by distance of E on that surface. The optical beam has a diameter of wi at the fixed position on the first reflecting face but considering α which is a maximum angle of incidence on the first reflecting face, the beam has a diameter of wi' on the first reflecting face in the main scanning direction, which is expressed by wi'=wi/cos α. The margin for the incident optical beam on the first reflecting face relative to its geometric size W is equivalent to W minus E and wi', as divided by two so that the halves are equally distributed on both sides of the first reflecting face.

Referring now to the second reflecting face, the incident optical beam will track the center of this reflecting face and, hence, the margin for the incident optical beam on the second reflecting face relative to its geometric size W is equivalent to W minus wo' (the diameter of the incident optical beam on the second reflecting face in the main scanning direction), as divided by two so that the halves are equally distributed on both sides of the second reflecting face. It should be noted that wo' is related to wo as wi' is to wi.

If a laser beam has a Gaussian distribution in profile intensity, its diameter is generally defined as the size at which the intensity is $1/e^2$ (i.e., 13.5%) of the value at the beam center. However, the optical beam passing through the optics in the optical scanner of the present invention is not necessarily a Gaussian beam, so wi and wo which represent the diameters of the optical beam incident on the first and second reflecting faces which are calculated for the Gaussian beam are corrected appropriately to determine wi' and wo'. Specifically, in the exemplary calculations set forth in the first and subsequent embodiments of the invention, the respective diameters of the optical beam as determined on the assumption that it is a Gaussian beam are multiplied by a factor of 1.1.

Table 1 lists the optical beam diameters (wi' and wo'), the focal length (f) of the transmission lens and other parameters for two system designs, one according to the first embodiment of the invention and the other being the conventional art system already described above, as calculated on the basis of the mathematical relations set forth above and the concept of the margin in the diameter of optical beam with respect to the geometric size of each reflecting face of the rotating polygonal mirror.

The angle of rotation θ1 of the polygonal mirror is shown for each system as angle that will finally provide a maximum scanned angle for the optical beam. In addition, each system was adapted such that the optical beam on the first reflecting face would have a margin of 0.5 mm in size with respect to the geometric size of the first reflecting face.

TABLE 1

| Parameter | Invention | Prior Art |
|---|---|---|
| Angle of rotation (θ1) of the polygonal mirror | 11.5° | 13.5° |
| Angle of deflection (θ2) by the transmission optics | 6.5° | (0°) |
| Scanned angle (θs) of the final optical beam | 29.5° | 27° |
| Focal length (fs) of the scanning optics | 320 mm | 350 mm |
| Diameter of optical beam (wi') on the first reflecting face | 2.1 mm | (0 mm) |
| Diameter of optical beam (wo') on the second reflecting face | 7.4 mm | 7.8 mm |
| Focal length (f) of the transmission lens | 44 mm | 11.5 mm |

Figure 3:
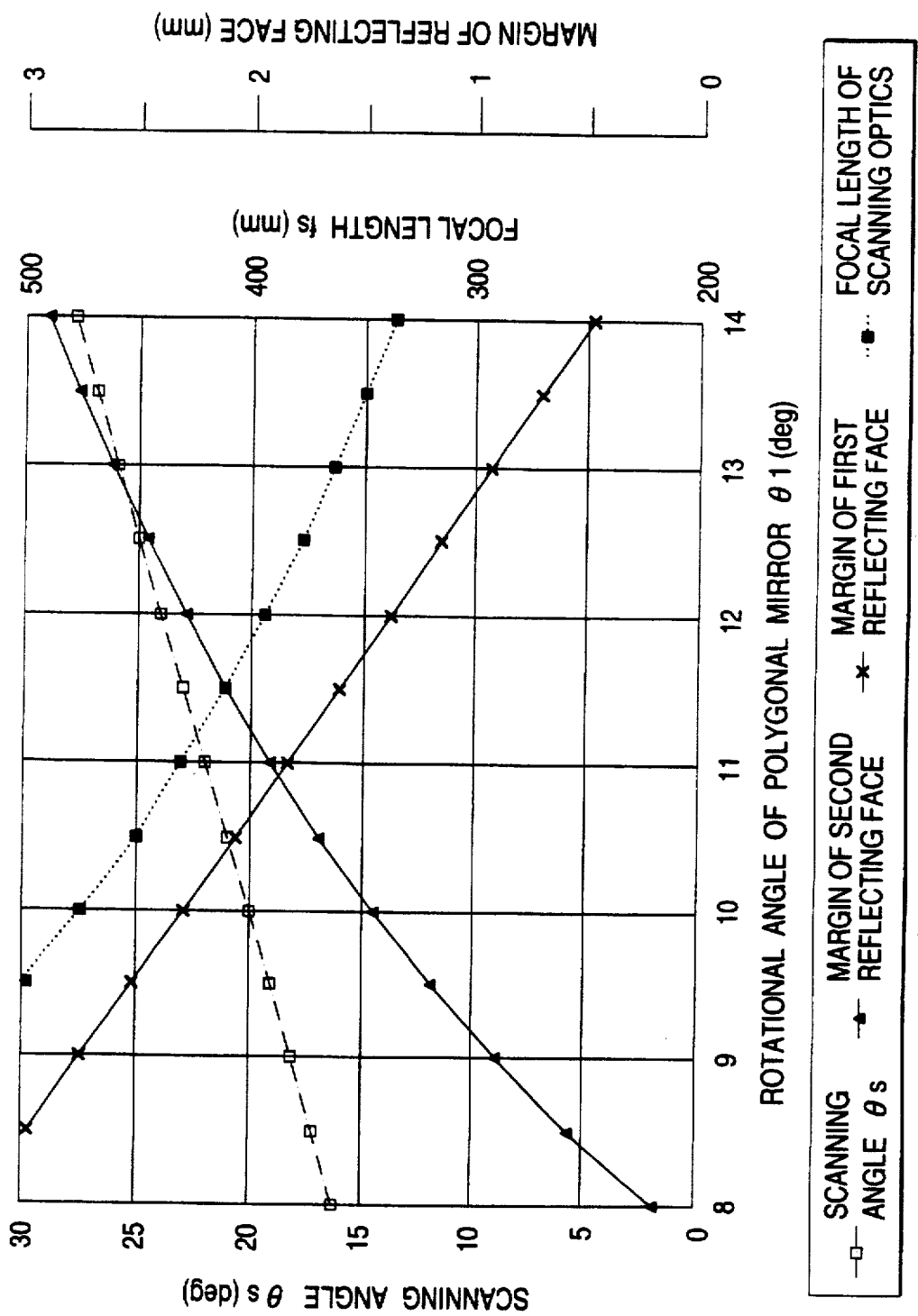
FIG. 3 is a characteristic diagram showing the margin of a reflecting face of the polygonal mirror, the scanned angle of an optical beam and the focal length of scanning optics as functions of the rotational angle setting of the polygonal mirror in a conventional art optical scanner.

FIG. 3 is a graph for the conventional art system that plots the rotational angle setting (θ1) of the polygonal mirror on the horizontal axis and which plots on the vertical axis the margin per side of the first or second reflecting face with respect to the diameter of an optical beam, the scanned angle (θs) of the optical beam and the corresponding focal length (fs) of the scanning optics. It should be noted that the rotational angle (θ1) of the polygonal mirror plotted on the horizontal axis refers to that value of θ1 at which is set a maximum angle of rotation that provides the displacement of the optical beam necessary to scan over a predetermined width on the target surface and θ1 by no means refers to the angle that is attained during scanning. Hence, optics having different values of θ1 on the horizontal axis will differ entirely in composition.

As is clear from FIG. 3, if the angle of rotation (θ1) of the polygonal mirror exceeds 13.5° in the conventional system, it is impossible to insure a margin greater than 0.5 mm per side of the first reflecting face. On the other hand, if θ1 is reduced, the scanned angle of the optical beam will also decrease, eventually increasing the focal length (fs) of the scanning optics.

Although Table 1 shows only the case of θ1=13.5°, the focal length (f) of the transmission optics in the conventional system will hardly change even if the angle of rotation (θ1) of the polygonal mirror is reduced. In other words, it is optimal for the conventional system to maximize the angle of rotation (θ1) of the polygonal mirror to the extent that is allowed by the margin of the optical beam with respect to the first reflecting face and it may well be the that the paraxial parameters of the transmission optics have little latitude in design.

In contrast, as Table 1 shows, the transmission lens 41 in the first aspect of the invention can be adapted to have a much greater focal length f than in the conventional system and, hence, there is assured ease in the removal of aberrations and lens manufacture. In addition, the distance from the first reflecting face to the transmission lens 41 can be sufficiently extended to provide ease in establishing the layout of optics around the first reflecting face 31.

In the conventional system, the scanned angle of the optical beam leaving the second reflecting face is 2·θ1; according to the first aspect of the invention, the scanned angle of the optical beam leaving the second reflecting face to be launched into the scanning optics can be increased to 2·θ1+θ2, whereby the focal length (fs) of the scanning optics is sufficiently shortened to realize a compact optical scanner.

In the numerical data shown in Table 1, the optical beam on the first reflecting face in the main scanning plane has a diameter (wi) as much as 2.1 mm, so the flaws or dust buildup on the reflecting faces of the polygonal mirror will cause extremely small effects on the imaging performance of the system if they are not serious or extensive.

Figure 4:
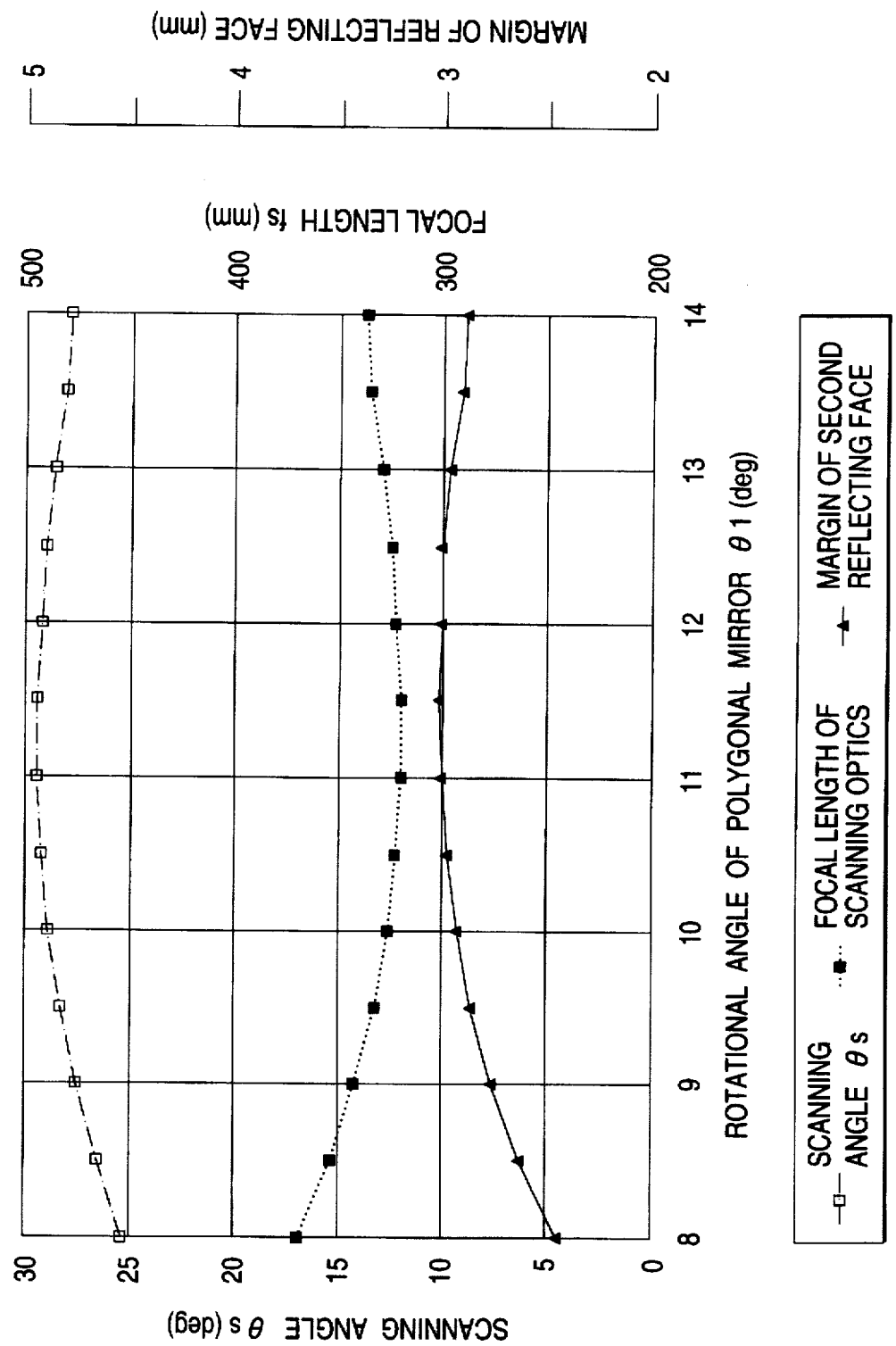
FIG. 4 is a characteristic diagram showing the margin of a reflecting face of the polygonal mirror, the scanned angle of an optical beam and the focal length of scanning optics as functions of the rotational angle setting of the polygonal mirror in the optical scanner according to the first embodiment of the invention.

FIG. 4 is a graph for the first embodiment of the invention which, as in FIG. 3, plots the angle of rotation (θ1) of the polygonal mirror on the horizontal axis while plotting on the vertical axis the margin per side of the second reflecting face with respect to the diameter of the optical beam on that reflecting face, the scanned angle (θs) of the optical beam and the corresponding focal length (fs) of the scanning optics.

By controlling the value of θ2, the margin for the first and second reflecting faces can be set at any desired values but it is assumed in FIG. 4 that the margin in the size of the first reflecting face with respect to the optical beam on that reflecting face is 0.5 mm.

As is clear from the comparison between FIG. 4 and Table 1, if the angle of rotation (θ1) of the polygonal mirror is within the range of 9.5° to 13.5°, namely, if the lateral magnification (β) produced by the transmission optics is within the range from about 2 to about 20, the scanned angle of the optical beam can exceed 28° which is shown in Table 1 as the maximum value that can be attained by the conventional art. Hence, by assuring that β is within the stated range, one can increase the scanned angle such that the focal length of the scanning optics is sufficiently shortened to realize a compact optical scanner, thereby achieving the advantages of the first aspect of the invention.

FIG. 4 additionally shows that the scanned angle of the optical beam attains a maximum value of 29.5° when the angle of rotation (θ1) of the polygonal mirror is 11.5° but it is also clear that scanned angles of at least 29° can be assured within the θ1 range of 10° to 12.5° and in the design of scanning optics, characteristics having no significant differences can be attained if θ1 is within the stated range. Similarly, the margin for the second reflecting face with respect to the optical beam diameter will not substantially change in the stated range of θ1.

Speaking of the lateral magnification β produced by the transmission optics, it is 2.22 at θ1=10° and 6.1 at θ1=12.5°.

This shows the breadth the range over which β, or the lateral magnification produced by the transmission optics, can be set while keeping the characteristics of the optical scanner under almost best conditions.

The advantages described above which result from the first aspect of the invention will be attained not only in the first embodiment but also in the second and third embodiments to be described hereinafter.

To describe a system design that corresponds to the second aspect of the invention, we will now give another example of numerical data for the first embodiment. A semiconductor laser emitting visible red light at a wavelength (λ) of 670 nm is used as the light source. The optical beam emerging after the second incidence on the rotating polygonal mirror 3 is required to scan over a range (Y) of 330 mm, producing a spot size (dO) of 50 μm in the main scanning direction on the surface to be scanned.

In the numerical data under consideration, it is assumed that the rotating polygonal mirror has 12 reflecting faces and that the inscribed circle of the mirror has a radius of 17.32 mm. The value 17.32 mm is selected because it matches the size of the inscribed circle of the common polygonal mirror on the market which has 6 reflecting faces, with the circumscribed circle having a diameter of 40 mm.

Given θ1 and θ2 on the basis of the determined values of λ, Y and dO, one can determine from Equations 3 and 5 the diameters (wi and wo) of the optical beam on the first reflecting face 31 and the second reflecting face 32, respectively, in the main scanning direction.

Figure 5:
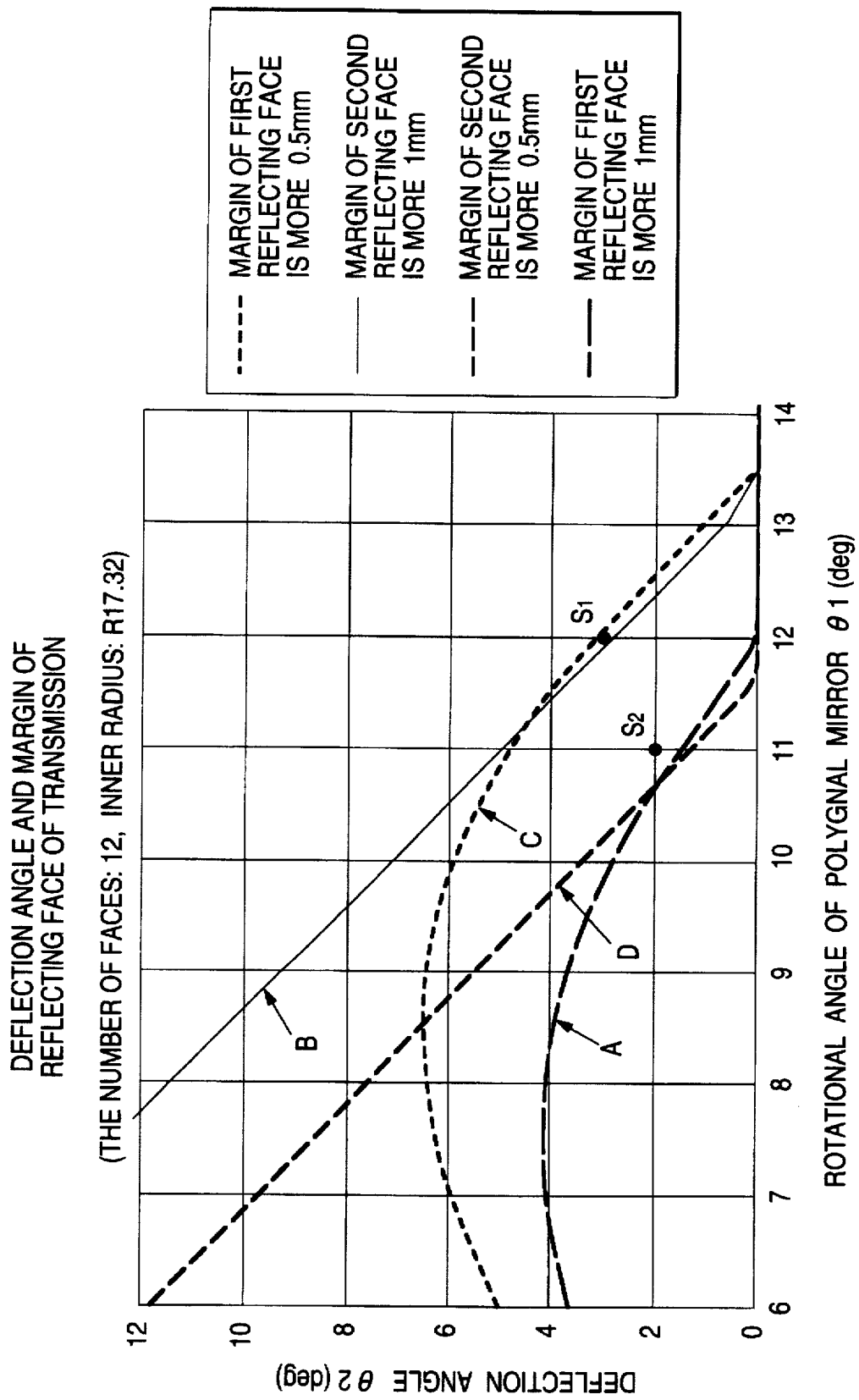
FIG. 5 is a characteristic diagram for illustrating the second aspect of the invention by showing four different conditions under which the optical beam on the first reflecting face and the second reflecting face of the rotating polygonal mirror will have a constant margin with respect to the geometric size of each reflecting face when the angle of rotation ($\theta 1$) of the polygonal mirror and the angle of deflection ($\theta 2$) by the transmission optics are given.

FIG. 5 shows four different conditions under which the optical beam on the first reflecting face 31 and the second reflecting face 32 will have a constant margin with respect to the geometric size of each reflecting face when the angle of rotation (θ1) of the polygonal mirror and the angle of deflection (θ2) by the transmission optics are given in association with the required scan width Y on the basis of the predetermined values of λ, Y and dO.

Each of the points in FIG. 5 which are determined by θ1 and θ2 refers to the settings of optics for scanning the required width Y and different points represent different types of optics.

Referring specifically to FIG. 5, the region under line A is where at least 1 mm of the above-defined margin can be ensured on the first reflecting face. The region above line B is where at least 1 mm of the above-defined margin can be ensured on the second reflecting face. Similarly, the region under line C is where at least 0.5 mm of the above-defined margin can be ensured on the first reflecting face, and the region above line D is where at least 0.5 mm of the above-defined margin can be ensured on the second reflecting face.

As is clear from FIG. 5, there exist no combinations of θ1 and θ2 that can ensure margins of at least 1 mm on both the first and second reflecting faces. Such margins must include the values corresponding to the following factors which were already mentioned in connection with the conventional art or the first embodiment of the invention: (i) the area of nonuse created by the chamfering of each boundary between adjacent reflecting faces; (ii) the area of nonuse created near each boundary between adjacent reflecting faces due to "sag" in machining; and (iii) the positional error in the center of rotation of the polygonal mirror with respect to the optical axis. As already noted, if these factors are taken into account, a minimum margin of at least 0.5 mm is desirably provided for each reflecting face of the rotating polygonal mirror. Referring to FIG. 5, this condition is satisfied by the region bound by lines C and D, in which a margin of at least 0.5 mm is ensured for both the first and second reflecting faces.

Speaking now of the scanned angle θs which is represented by 2·θ1+θ2, it increases toward the upper right corner of FIG. 5. Consider here two points S1 and S2 within the region bound by lines C and D in FIG. 5. Point S1 represents the value according to the second aspect of the invention whereas S2 represents the value in the conventional art. The values of θ1 and θ2, θs and the margins on the first and reflecting faces of the polygonal mirror are set forth below in Table 2 for each of points S1 and S2.

TABLE 2

| Point in FIG. 5 | S1 | S2 |
| --- | --- | --- |
| θ1 | 12° | 11° |
| θ2 | 3° | 2° |
| θs | 27° | 24° |
| Margin on the first reflecting face | 0.5 mm | 0.9 mm |
| Margin on the second reflecting face | 1.0 mm | 0.6 mm |

As is clear from Table 2, point S1 is in contrast with point S2 in that the margin on the second reflecting face is greater than the margin on the first reflecting face, thereby providing a greater value of θs which is the scanned angle of the optical beam. Stated more specifically, the closer to line C is a point within the region bound by lines C and D, the closer to 0.5 mm the margin on the first reflecting face and the greater than 0.5 mm the margin on the second reflecting face. In addition, a point in that region moves toward the upper right corner of FIG. 5 as it approaches line C and, hence, θs will increase accordingly.

Thus, by ensuring the minimum necessary margin on the first reflecting face while providing a greater margin on the second reflecting face, one can maximize the value of θs which is the scanned angle of the optical beam that is finally deflected after leaving the second reflecting face.

In the numerical data set forth above, the rotating polygonal mirror is assumed to be of a comparatively small size, so the margins on the first and second reflecting faces can be ensured in only a small region. However, this region can be expanded by (i) increasing the size of the rotating polygonal mirror, (ii) shortening the wavelength of the light source, (iii) reducing the scan width on the target surface to be scanned, or (iv) increasing the diameter of the focused image spot on the target surface in the main scanning direction.

Figure 6:
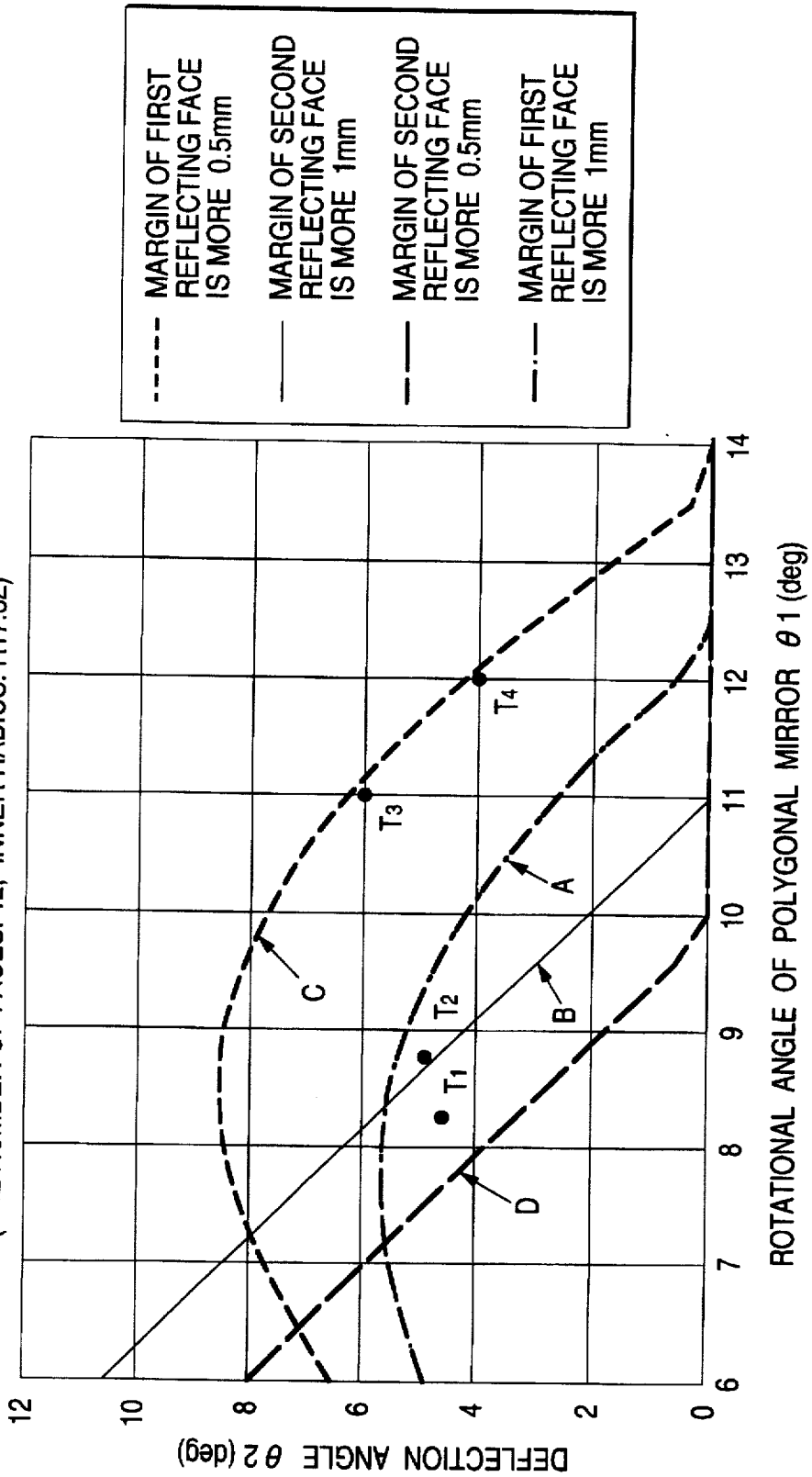
FIG. 6 is another characteristic diagram for illustrating the second aspect of the invention by showing four different conditions under which the optical beam on the first reflecting face and the second reflecting face of the rotating polygonal mirror will have a constant margin with respect to the geometric size of each reflecting face when the angle of rotation ($\theta 1$) of the polygonal mirror and the angle of deflection ($\theta 2$) by the transmission optics are given.

FIG. 6 is a graph based on the same numerical data discussed above, except that the size of the rotating polygonal mirror is increased to become equivalent to 40 mm in terms of the diameter of the inscribed circle. Lines A, B, C and D have the same definitions as in FIG. 5. Obviously, FIG. 6 has the region bound by lines A and B which is absent from FIG. 5 and, in addition, the region bound by lines C and D is larger than in FIG. 5.

For comparing various combinations of θ1 and θ2 in FIG. 6, let us consider two points T1 and T2 according to the conventional art, and two additional points T3 and T4 according to the second aspect of the invention, and set forth the characteristics for the respective points in Table 3 below. In the concept of the conventional art, the margin of the optical beam on the first and second reflecting faces with respect to the geometric size of each reflecting face has not been taken into consideration, so values have sometimes been selected that correspond to points T1 and T2.

TABLE 3

| Point in FIG. 6 | T1 | T2 | T3 | T4 |
| --- | --- | --- | --- | --- |
| θ1 | 8.3° | 8.8° | 11° | 12° |
| θ2 | 4.5° | 4.8° | 6° | 4° |
| θ3 | 21.1° | 22.4° | 28° | 28° |
| Margin on the first reflecting face | 1.2 mm | 1.1 mm | 0.5 mm | 0.5 mm |
| Margin on the second reflecting face | 0.8 mm | 1.0 mm | 1.8 mm | 1.9 mm |
| Lateral magnification β produced by the transmission optics | 3.667 | 3.667 | 3.667 | 6 |

As is also clear from FIG. 6, the ratio of θ1 to θ2, namely, the lateral magnification β produced by the transmission optics, is entirely the same at points T1, T2 and T3. In addition, the scanned angle θs is the same at points T3 and T4 according to the second aspect of the invention. Thus, even in the case under consideration where the rotating polygonal mirror has a comparatively large margin of size, the scanned angle θs can be increased over the conventional art case (T1 and T2) by ensuring that the margin on the first reflecting face is at a minimum value of 0.5 mm as at points T3 and T4 according to the second aspect of the invention.

In the numerical data set forth above, the wavelength of the light source is assumed to be 670 nm. If calculations are made with the more common 780 nm, there no longer exist those combinations of θ1 and θ2 which ensure margins of at least 1 mm on both the first and second reflecting faces, nor does a region where a margin of at least 1 mm is ensured on either the first or the second reflecting face whereas a margin of at least 0.5 mm is ensured on the other reflecting face. This situation is more hostile than in the case illustrated in FIG. 5 where the light source emits at the wavelength of 670 nm and the inscribed circle of the rotating polygonal mirror has a radius of 17.32 mm. It is therefore clear that changing the wavelength of the light source from 780 nm to 670 nm is effective in reducing the radius of the rotating polygonal mirror by about 3 mm.

In the present invention, scanning is performed with an optical beam being allowed to be incident twice on the rotating polygonal mirror and this is in order to increase the number of reflecting faces of the polygonal mirror and yet reduce its size (the radius of its inscribed circle) to a small enough value that enables its practical manufacture; therefore, it is desirable that the margin of the reflecting faces of the polygonal mirror is reduced to the smallest possible value. According to the second aspect of the invention, the margin of the first reflecting face is reduced to a practically feasible limit to thereby reduce the size of the rotating polygonal mirror. This effect is further enhanced by shortening the wavelength of the light source as just described above.

Thus, according to the second aspect of the invention, the scanned angle θs can be increased by ensuring that the margin of the diameter of an optical beam on a reflecting face of the rotating polygonal mirror and its movement on the reflecting face with respect to the geometric size of the reflecting face is made greater on the second reflecting face than on the first reflecting face.

The second advantage of the second aspect of the invention is now described. In the invention, the optical beam deflected by the first reflecting face of the rotating polygonal mirror is directed to the second reflecting face by means of the transmission optics and to this end, it is required that the optical axis of the transmission optics be positioned correctly with respect to the center of rotation of the polygonal mirror while, at the same time, the optical beam incident on the second reflecting face should follow exactly the movement of the latter.

However, when the optical beam is caused to follow the second reflecting face by the action of the transmission optics, it is difficult to ensure that the center of the beam is at all times in exact registry with the center of that reflecting face. There are three typical reasons for this difficulty and they are as follows:

(i) the result of paraxial calculations differs from the image height obtained in the actual optics; stated more specifically, even if the optical beam is deflected by the first reflecting face at uniform speed, the linear speed will increase as the point of incidence departs from the optical axis;

(ii) aberrations and other inherent characteristics of the transmission optics will prevent the optical beam from moving on the second reflecting face at a constant speed and this introduces a characteristic that even differs from the effect described in (i), i.e., the linear speed increases as the point of incidence departs from the optical axis; and (iii) the error in the machining, assembling or adjusting of the transmission optics will cause an error in the position at which the optical axis through the transmission optics is incident on the second reflecting face.

Because of these reasons, the optical beam incident on the second reflecting face is incapable of following its rotational movement in a completely exact manner but an error is caused. This error is hereunder referred to as a "tracking error". In order to ensure that the tracking optical beam will not go beyond the limits of the second reflecting face even if the beam makes a relative movement by an amount corresponding to the "tracking error", the margins so far discussed above are desirably made greater on the second reflecting face than on the first reflecting face.

As already described above, according to the second aspect of the invention, the margins of the size of the optical beam on the second reflecting face with respect to the geometric size of the reflecting face are adjusted to be greater than the margins of the size of the optical beam and its relative movement on the first reflecting face and this offers the advantage that even if the "tracking error" defined above takes place, the optical beam incident on the second reflecting face will not go beyond the limits of the practically useful region of that reflecting face.

The characteristics described above with reference to FIGS. 5 and 6 are applicable not only in the first embodiment of the invention but they are also applicable with equal results to the third and fourth embodiments to be described hereinafter. It should, however, be noted that since transmission optics of different compositions are employed in the first, third and fourth embodiments, the lateral magnification β which is determined by given values of θ1 and θ2 will be satisfied by different specific configurations of the transmission optics.

In the first embodiment of the invention described above, the transmission optics can be composed of a single lens group or a single lens element and this contributes greatly to the realization of a smaller and less expensive system.

In this first embodiment of the invention, the optical beam incident on the first or second reflecting face of the rotating polygonal mirror runs by normal incidence in the main scanning plane at the point of time when the scanning optical beam is scanning an area near the center of the required scan region. Therefore, as already mentioned, the optical beam is allowed to be incident on each reflecting face with its optical axis being inclined in the sub-scanning cross section, thereby ensuring that the incident optical beam will not interfere with the deflected optical beam as reflected from the reflecting face. The same effect can be attained by tilting the optical axis of the incident beam in the main scanning plane with respect to each reflecting face. The second embodiment of the invention is thus constructed.

Figure 7:
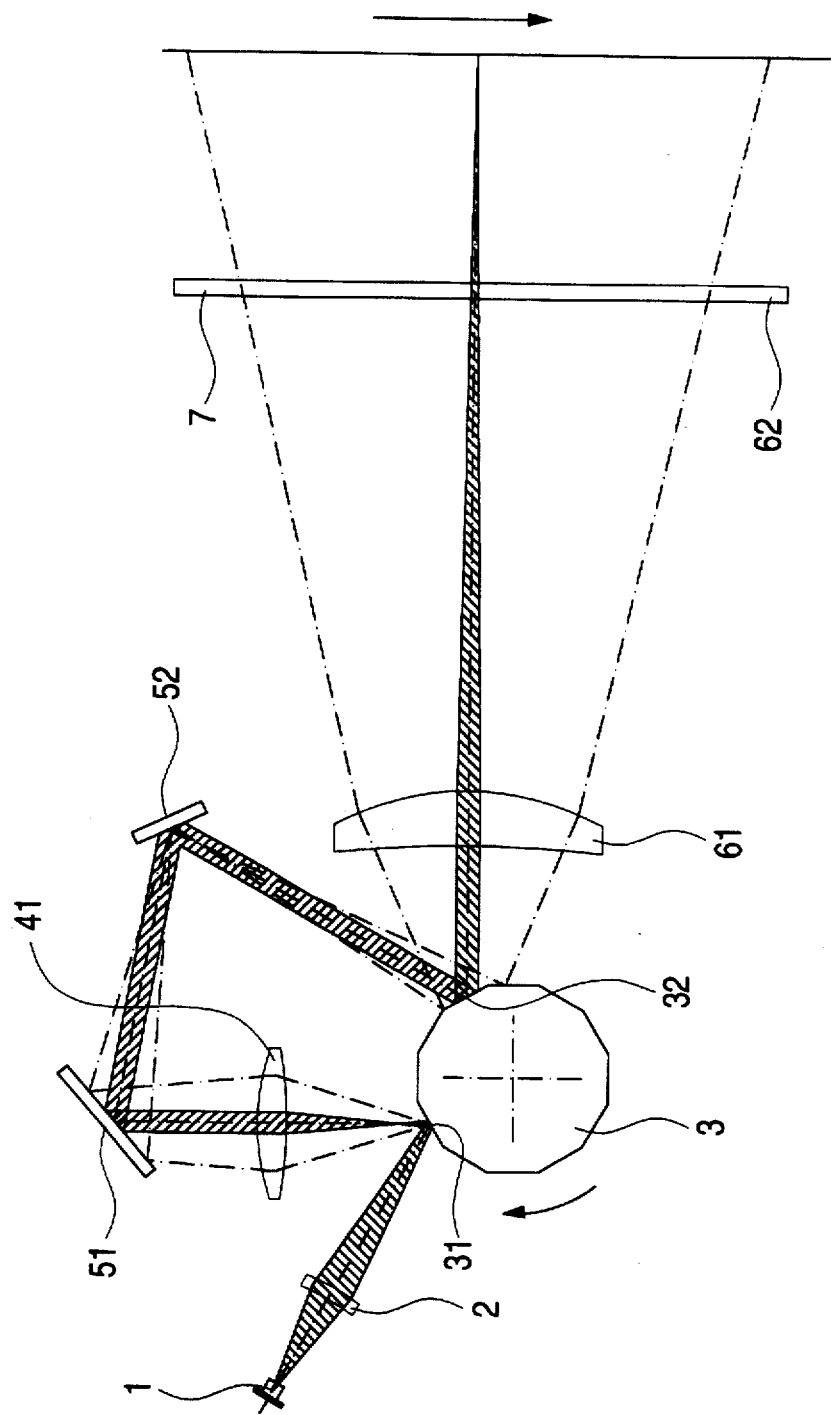
FIG. 7 is a plan view of an optical scanner according to the second embodiment of the invention as it is seen in the main scanning plane.

FIG. 7 is a plan view of an optical scanner according to the second embodiment of the present invention as it is seen through the main scanning cross section. The optical axes of the incident beam and the deflected beam are inclined in the main scanning plane with respect to the first reflecting face 31 and the second reflecting face 32 and the optics can be disposed coextensively with the main scanning plane; therefore, the optical axes need not be tilted in the sub-scanning cross section as in the first embodiment.

The only problem with the second embodiment is that since the optical beam is incident at an angle on each reflecting face of the rotating polygonal mirror, the size of the reflecting face must be increased by an amount corresponding to the obliquely projected length of the beam diameter. In particular, the size of the optical beam on the second reflecting face 32 is by far greater than on the first reflecting face 31, so the margin of the optical beam on the second reflecting face 32 requires careful consideration. However, according to the first or second aspect of the invention, the scanned angle of the optical beam can be increased over the conventional art and, hence, the size of the optical beam on the second reflecting face can be reduced accordingly and this offers a great benefit in the case where the overall optics is disposed in the main scanning plane as in the second embodiment under discussion.

Figure 8:
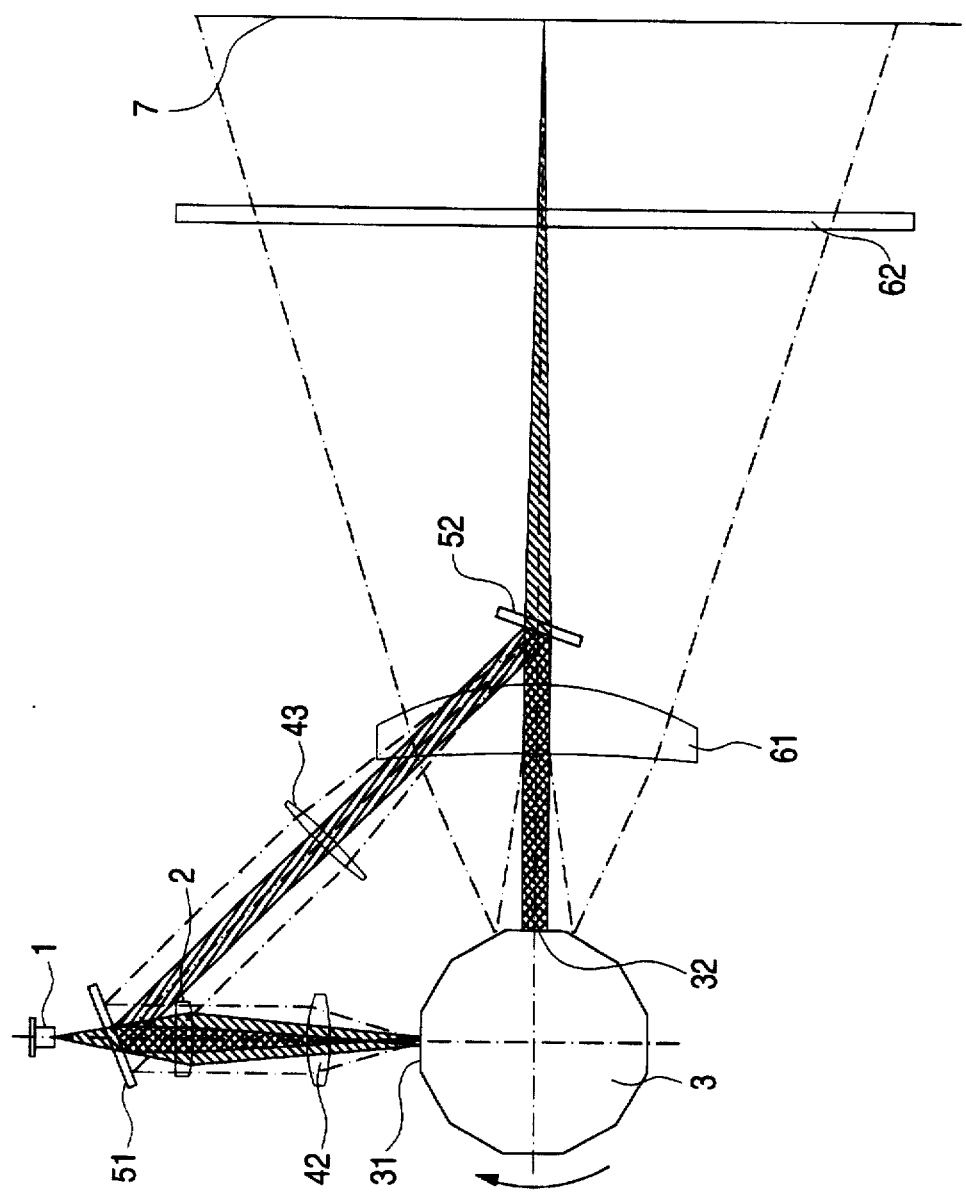
FIG. 8 is a plan view of an optical scanner according to the third embodiment of the invention as it is seen in the main scanning plane.

An optical scanner according to the third embodiment of the invention is now described. FIG. 8 is a plan view of this optical scanner as it is seen through the main scanning cross section. A semiconductor laser 1 is used as the light source and the laser beam emitted as divergent light is shaped to a convergent optical beam by means of a collimator lens 2. As in the first embodiment, the convergent optical beam is incident on the first reflecting face 31 of a rotating polygonal mirror 3.

The optical beam deflected by the first reflecting face 31 is made convergent, then becomes divergent and enters the first transmission lens 42 composing the transmission optics 4. The optical beam emerging from the first transmission lens 42 becomes slightly divergent and is reflected by a mirror 51 to enter the second transmission lens 43. The optical beam passing through the second transmission lens 43 is collimated and has its optical axis reoriented by a reflecting mirror 52 before it is incident on the second reflecting face 32 of the rotating polygonal mirror 3.

As in the first embodiment, the optical beam incident on the second reflecting face 32 has its center moved such as to follow the center of that face in response to its deflection by the first reflecting face 31. The optical beam as deflected by the second reflecting face 32 passes through a scanning lens 61 and a compensator lens 62 to be shaped to a convergent beam, which then forms a focused image on a surface to be scanned 7. The scanning lens 61 and the compensator lens 62 combine to make up scanning optics, with which an optical beam that is scanned at a generally uniform angular velocity is allowed to scan over the surface 7 at a uniform linear speed.

In FIG. 8, the optical axis of the beam incident on the first reflecting face 31 is shown to overlap the optical axis of the deflected beam on the paper but, in fact, as in the first embodiment, the two optical axes are spaced apart and inclined with respect to each other in the sub-scanning plane, i.e., in a direction normal to the paper. Similarly, the optical axis of the beam incident on the second reflecting face 32 and the optical axis of the deflected beam are inclined with respect to each other in a plane including the axis of rotation of the polygonal mirror.

In the first embodiment, the transmission optics 4 is composed of either a single lens element or a single lens group. In the third embodiment, the transmission optics is composed of two lens elements or two lens groups. Despite of this compositional difference, the theory behind the transmission optics described in connection with the first embodiment is equally applicable to the third embodiment if the transmission optics is considered as a single lens. In particular, Equation 3 which relates the magnification β of the transmission optics 4 either to the diameters (wi, wo) of the optical beam on the first and second reflecting faces, respectively, or to the angle of rotation (θ1) of the polygonal mirror and the angle of deflection (θ2) of the optical beam emerging from the transmission optics 4 is also applicable to the third embodiment.

Compared to the transmission optics in the first embodiment which is composed of the single lens element 41, the transmission optics 4 in the third embodiment which is composed of two lens elements (or two lens groups) enables the first transmission lens 42 to have a small optical power and, hence, a small effective aperture. In other words, the transmission optics in the third embodiment has the plural lens elements but the individual lens elements can be manufactured more easily than in the first embodiment.

Figure 9:
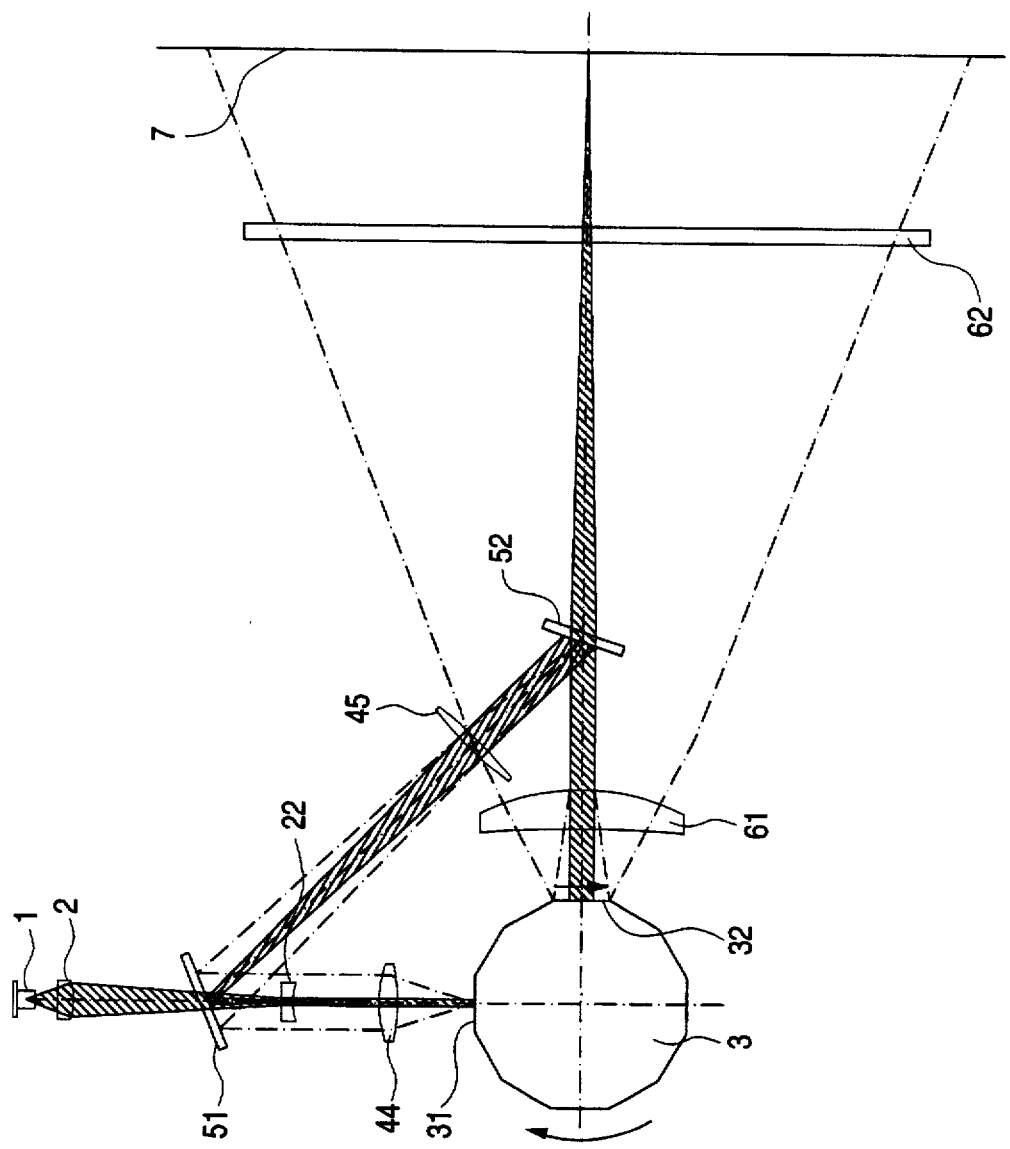
FIG. 9 is a plan view of an optical scanner according to the fourth embodiment of the invention as it is seen in the main scanning plane.

We now describe an optical scanner according to the fourth embodiment of the invention. FIG. 9 is a plan view of this optical scanner as it is seen through the main scanning cross section. A semiconductor laser 1 is used as the light source and the laser beam emitted as divergent light is shaped to a convergent optical beam by means of a collimator lens 2. The convergent optical beam is admitted into a shaping lens 22 and transformed to a beam of parallel light having a comparatively small diameter. This parallel beam is incident on the first reflecting face 31 of a rotating polygonal mirror 3.

The optical beam deflected by the first reflecting face 31 is admitted into the first transmission lens 44 which composes the transmission optics 4. The first transmission lens 44 transforms the incident optical beam into a convergent beam, which forms a focused image before it is incident on a reflector mirror 51. At this point of time, the deflected optical beam is divergent and then admitted into the second transmission lens 45. The second transmission lens 45 is located in such a way that its front focus coincides with the back focus of the first transmission lens 44 and these two lens elements combine to make up afocal optics. Therefore, the optical beam passing through the transmission lens 44 is again collimated and has its optical axis reoriented by a reflector mirror 52 before it is incident on the second reflecting face 32 of the rotating polygonal mirror 3.

As the result of deflection by the first reflecting face 31, the optical beam incident on the second reflecting face 32 has its optical axis moved such as to follow the center of that second reflecting face. The optical beam deflected by the second reflecting face 32 passes through a scanning lens 61 and a compensator lens 62 to be shaped to a convergent beam, which then forms a focused image on a surface to be scanned 7. The scanning lens 61 and the compensator lens 62 combine to make up scanning optics, with which an optical beam that is scanned at a generally uniform angular velocity is allowed to scan over the surface 7 at a uniform linear speed.

In FIG. 9, the optical axis of the beam incident on the first reflecting face 31 is shown to overlap the optical axis of the deflected beam on the paper but, in fact, as in the first or third embodiment, the two optical axes are spaced apart and inclined with respect to each other in the sub-scanning plane, i.e., in a direction normal to the paper. Similarly, the optical axis of the beam incident on the second reflecting face 32 and the optical axis of the deflected beam are inclined with respect to each other in a plane including the axis of rotation of the polygonal mirror.

The action of the transmission optics in the optical scanner according to the fourth embodiment of the invention is now described in detail. The transmission optics in the optical scanner described above with reference to FIG. 9 is straightened out along the optical path including the reflector mirrors 51 and 52 and shown in the main scanning cross section in FIG. 10.

The parallel optical beam incident on the first reflecting face 31 has a diameter of wi on this reflecting face. Since the transmission optics 42 is afocal, the optical beam is transformed to a parallel beam having a diameter of wo in the position of the second reflecting face 32. Thus, the beam diameter ratio of wo to wi (wo/wi) is equal to f2 divided by f1, where f1 is the focal length of the first transmission lens 44 and f2 is the focal length of the second transmission lens 45.

As in the first or third embodiment, if the polygonal mirror 3 rotates by an angle of θ1, the optical beam incident on the first reflecting face 31 is deflected by twice the angle θ1. The deflected optical beam passes through the transmission lenses 44 and 45 to be further deflected by an angle of θ2. This optical beam crosses the optical axis at point Q. Thereafter, the optical beam is incident on the second reflecting face 32 and at this point of incidence, the distance between the deflected optical beam and the optical axis is equal to δ, by which amount each reflecting face moves when the polygonal mirror 3 rotates by the angle θ1.

In this case, the deflected optical beam is further deflected in such a direction that the angle of incidence on the second reflecting face increases by the angle θ2, so the scanned angle θs of the optical beam reflected from the second reflecting face is expressed as θs=2·θ1+θ2. In other words, the angle of deflection of the optical beam can be increased by θ2 compared to the usual system in which the optical beam is incident on the rotating polygonal mirror only once, or to the system in which the optical beam follows the movement of the second reflecting face 32 by making a parallel shift.

In the fourth embodiment, the transmission optics 4 is afocal, so the lateral magnification β it produces is equal to f2 divided by f1, or the ratio of wo to wi (wo/wi). In addition, the deflected optical beam has its deflection angle changed from 2·θ1 to θ2 as it passes through the transmission optics 4 and, hence, the lateral magnification β is also expressed by 2·θ1/θ2. Therefore, the lateral magnification A can be expressed as follows:

$$\beta = \frac{2 \cdot \theta_1}{\theta_2} = \frac{f_2}{f_1} = \frac{wo}{wi} \qquad \text{(Eq. 6)}$$

Figure 10:
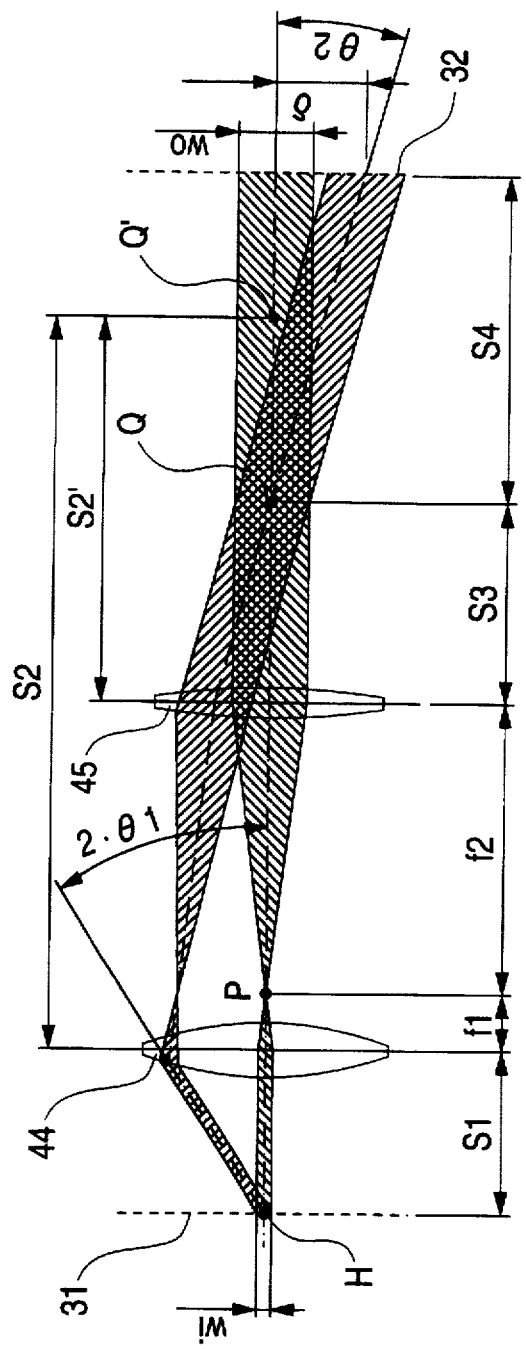
FIG. 10 is a cross section of the optical scanner according to the fourth embodiment as it is straightened out along the optical axis including the first and second reflecting faces of the rotating polygonal mirror and shown in the main scanning plane.

As FIG. 10 shows, the first transmission lens 44 is positioned a distance of Si away from the first reflecting face 31. The optical beam deflected by the first reflecting face 31 is reoriented by the first transmission lens 44 and its principal ray crosses the optical axis at point Q' which is a distance of S2 away from the first transmission lens 44.

The optical beam traveling toward point Q' is reoriented by incidence on the second transmission lens 45 and its principal ray crosses the optical axis at Point Q which is a distance of S3 away from the second transmission lens 45. Point Q' is away from the second transmission lens 45 by a distance of S2'.

The optical beam crossing the optical axis at point Q is incident on the second reflecting face 32 which is located a distance of S4 away from point Q.

The sign convention of S1, S2, S2' and S3 is such that they are all positive in the image space as seen from the respective transmission lenses.

As already noted, the transmission lenses 44 and 45 have respective focal lengths of f1 and f2, so S1 and S2 can be related to f1 by Equation 7 whereas S2' and S3 can be related to f2 by Equation 8 as follows:

$$-\frac{1}{S1} + \frac{1}{S2} = \frac{1}{f1} \quad \text{(Eq. 7)}$$

$$-\frac{1}{S2'} + \frac{1}{S3} = \frac{1}{f2} \quad \text{(Eq. 8)}$$

Referring now to δ which represents the amount of movement required for the deflected optical beam to follow the second reflecting face 32 is paraxially equal to S4 (the distance from crossing point Q to the second reflecting face 32) multiplied by the angle θ2.

We next consider the focal length of the scanning optics. Write fs for the focal length, in the main scanning direction, of the scanning optics which causes the deflected optical beam from the second reflecting face 32 to form a focused image on the surface to be scanned. With so-called "fθ" optics which allows an imaging spot to be located on the surface to be scanned at position y the departure of which from the optical axis is proportional to the scanned angle θ' of the optical beam, the relationship y=fs·θ' holds. One half of the required scan width Y is scanned as the polygonal mirror rotates by the angle θ1. Substituting Y/2 for y and also replacing θ' with θs which is determined by θ1 and θ2, one can determine fs. Given fs, the diameter wo of the optical beam on the reflecting face 32 can be calculated by Equation 4 set forth in connection with the description of the first embodiment. Given wo, wi is also determined by Equation 6 or 2.

The relationship between the geometric size of a reflecting face of the polygonal mirror and the margin of the size of an optical beam on the reflecting face, as described in connection with the first embodiment of the invention by reference to FIGS. 5 and 6, is also valid in the above-described fourth embodiment. Thus, the advantages of the second aspect of the present invention are achieved irrespective of the specific composition of the transmission optics.

In the already described first, third or fourth embodiment of the invention, the optical beam incident on the first or second reflecting face of the rotating polygonal mirror is characterized by normal incidence in the main scanning plane at the point of time when the scanning optical beam is scanning an area near the center of the required scan region. In practice, however, due to the rotational movement of the reflecting faces of the polygonal mirror, the optical beam incident at a position offset from the normal incidence has an angle with respect to the reflecting face and, stated exactly, the diameter of the optical beam on the reflecting face is increased by an amount corresponding to that angle.

It should also be noted that at the point of time when the optical beam is incident normal to each reflecting face of the rotating polygonal mirror, the optical axis of the beam shaping optics or transmission optics does not necessarily coincide with the center of the reflecting face in the main scanning direction and there may be a slight offset (or asymmetry) depending on the specific construction of the optical scanner.

Similarly, the relative movement E of the optical beam incident on the first reflecting face must take into account the tilting of that reflecting face with respect to the incident beam.

The effects of such tilting are negligible if the angle of rotation θ1 of the polygonal mirror is small but if it is large enough, the effects must be taken into account as required in calculating the margins of the reflecting faces.

In the already described embodiments of the invention, the effects of tilting were taken into account when calculating wi' and wo' which represent the diameters of the optical beam on the first and second reflecting faces, respectively, from wi and wo which represent the diameters of the optical beam before it is incident on those reflecting faces.

In the second embodiment of the invention, the optical beam incident on the first or second reflecting face of the rotating polygonal mirror is characterized not by normal incidence but by incidence at an angle in the main scanning direction over the entire range of the required scan region. In a case like this, the aforementioned effects of tilting are significant and the margins of the reflecting faces must be calculated by taking into account the diameters of the optical beam as measured on the reflecting faces.

Needless to say, if calculations for the second embodiment are made by taking into account the inclination of the incident beam with respect to the reflecting faces in the main scanning plane, the margins of the reflecting faces will become smaller than the values shown by reference to FIGS. 5 and 6. Even in this case, the advantage of the second aspect of the invention which is due to the fact of providing greater margins on the second reflecting face for this size for the diameter of the optical beam and relative movement of the optical beam than on the first reflecting face is exhibited to an equal extent.

However, better results are attained in the first, third and fourth embodiments in which the optical axis of a beam incident on the rotating polygonal mirror crosses its optical axis and this is because the size of the optical beam on each reflecting face of the polygonal mirror is made sufficiently small to reduce the size of the polygonal mirror.

As described, in the optical scanner according to the first aspect of the invention, the convergent optical beam incident on the first reflecting face of a rotating polygonal mirror forms a focused image at a point located between the first reflecting face and the first lens in the transmission optics; this ensures that the optical beam on the first reflecting face will have an increased diameter in the main scanning plane, thereby enabling satisfactory scanning without any adverse effects on the imaging in the surface to be scanned which would otherwise be produced by flaws or dust buildup on the reflecting faces of the polygonal mirror.

In addition, the focal length of the transmission optics can be sufficiently extended to not only facilitate the manufacture of lenses in the transmission optics but also reduce the precision required in mounting the optics in an optical scanner, thereby contributing to the realization of an inexpensive and yet reliable system. What is more, the transmission optics can be positioned sufficiently farther away from the first reflecting face of the polygonal mirror that ease is provided in the layout of optics around the first reflecting face, thereby contributing to size reduction of the system.

As a further advantage, the scanned angle of the scanning optical beam obtained by the second reflection from the rotating polygonal mirror is made great enough to shorten the focal length fs of the scanning optics, thereby enabling the reduction of its overall size.

If the magnification β produced by the transmission optics in the optical scanner according to the first aspect of the invention is adjusted to lie in the range of 2 to 20, the scanned angle of the scanning optical beam can be made greater than in the conventional art system where the incident beam is allowed to converge on the first reflecting face of the polygonal mirror and this enables the aforementioned advantages to be exhibited to the fullest extent.

Particularly in the case where β is between 6 and 12, the transmission optics can be designed with great latitude while introducing little change in the scanned angle of the scanning optical beam from an optimal value and this enables not only the optimization of aberrations introduced in the transmission optics but also the miniaturization of lenses in that optics.

In the first and second embodiments of the invention, the transmission optics is composed of a single lens element or a single lens group and yet the lateral magnification it produces can be set at a desired value and this contributes greatly to the realization of smaller and less expensive transmission optics.

According to the second aspect of the invention, the margins of the diameter and the relative movement of the optical beam on a reflecting face of the rotating polygonal mirror with respect to the geometric size of the reflecting face are made greater on the second reflecting face than on the first reflecting face; this enables the scanned angle Os of the optical beam to be increased in the scanning optics, which contributes to a shorter focal length fs, thus realizing compact scanning optics.

If the margins on the reflecting faces are set at those values which satisfy the condition set forth above and which are the minimum necessary values, the size of the polygonal mirror can be easily minimized. As a result, a small torque need be produced by the motor for driving the polygonal mirror and, in addition, a comparatively low stiffness is required for the bearing; hence, an inexpensive motor may be employed.

In other words, if it is not necessary to markedly reduce the size of the polygonal mirror, the number of reflecting faces can be increased to achieve a corresponding increase in the number of scan cycles per unit time.

In the second aspect of the invention, the margins of the diameter and the relative movement of the optical beam on a reflecting face of the rotating polygonal mirror with respect to the geometric size of the reflecting face are made greater on the second reflecting face than on the first reflecting face and this offers the added advantage that even if a "tracking error" of the nature already defined hereinabove occurs, the optical beam incident on the second reflecting face will not go beyond the limits of its practically useful region.

In the first, third and fourth embodiments of the invention, the optical beam incident on a reflecting face of the polygonal mirror is characterized by normal incidence in the main scanning plane at the center of the required scan region. But this is not the case in the second embodiment. Compared with such second embodiment, the optical beam on each reflecting face of the polygonal mirror and, hence, the polygonal mirror per se can be made sufficiently small to further enhance the advantages of the second aspect of the invention.

The incident optical beam has a larger diameter on the second reflecting face than on the first reflecting face and, hence, the system of allowing the optical beam to be incident normal to the reflecting face in the main scanning plane at the center of the required scan region will prove particularly effective on the second reflecting face.

In the conventional optical scanner, a semiconductor laser emitting a near infrared radiation at a wavelength of about 780 nm is used as a light source. According to the second aspect of the invention, this may be replaced by a semiconductor laser emitting visible red light at a wavelength shorter than 700 nm and assuming a rotating polygonal mirror having 12 reflecting faces, the radius of its inscribed circle can be reduced by about 3 mm. If the radius of the inscribed circle of the polygonal mirror is the same, the invention system permits the latter to have one more reflecting face added.

What is claimed is:

1. An optical scanner comprising:

a light source, beam shaping optics for transforming an optical beam from said light source into a convergent beam, a rotating polygonal mirror having at least a first reflecting face for deflecting said convergent beam, a second reflecting face, and an axis of rotation, said first reflecting face and said second reflecting face having in common a plane crossing said axis of rotation at right angles, and transmission optics having a lens, with which the optical beam deflected by said first reflecting face is incident on said second reflecting face, with the optical beam incident on said second reflecting face being deflected therefrom to produce a scanning optical beam which scans a predetermined surface to be scanned;

wherein said convergent optical beam forms a focused image at a point located between said first reflecting face and said lens in said transmission optics.

2. The optical scanner according to claim 1, wherein said transmission optics comprises a single lens element.

3. The optical scanner according to claim 1, further comprising a β value of 2 to 20, with β being equal to θ1 times two divided by θ2, where θ1 is the angle of rotation of the rotating polygonal mirror in the case where said scanning optical beam is positioned the farthest from the optical axis and θ2 is the angle of deflection which the optical beam from said transmission optics forms with the optical axis when it is incident again on said polygonal mirror as it is rotating by the angle θ1.

4. The optical scanner according to claim 1, wherein during a time period for which said scanning optical beam scans over a predetermined region, the geometric size of said second reflecting face minus wo' is adjusted to be greater than the geometric size of said first reflecting face minus wi' and E, where:

wi' is a maximum value which the diameter of said convergent optical beam as measured in a respective plane crossing the angle of rotation of said rotating polygonal mirror at right angles, takes when said optical beam is incident on said first reflecting face, wo' is a maximum value which the diameter of the optical beam from said transmission optics, as measured in a respective plane crossing the angle of rotation of said rotating polygonal mirror at right angles, takes when said optical beam is incident on said second reflecting face, and E is the distance over which said convergent optical beam moves on said first reflecting face during the time period for which said scanning optical beam scans over a predetermined region.

5. An optical scanner comprising:

a light source, beam shaping optics for transforming an optical beam from said light source into a convergent beam, a rotating polygonal mirror having at least a first reflecting face for deflecting said convergent beam and a second reflecting face, and transmission optics having a lens, with which the optical beam deflected by said first reflecting face is incident on said second reflecting face, with the optical beam incident on said second reflecting face being deflected therefrom to produce a scanning optical beam which scans a predetermined surface to be scanned;

wherein said convergent optical beam forms a focused image at a point located between said first reflecting face and said lens in said transmission optics;

wherein said optical scanner has a $\beta$ value of 2 to 20, with $\beta$ being equal to $\theta 1$ times two divided by $\theta 2$, where $\theta 1$ is the angle of rotation of the rotating polygonal mirror in the case where said scanning optical beam is positioned the farthest from the optical axis and $\theta 2$ is the angle of deflection which the optical beam from said transmission optics forms with the optical axis when it is incident again on said polygonal mirror as it is rotating by the angle $\theta 1$.

6. An optical scanner comprising:

a light source, beam shaping optics for transforming an optical beam from said light source into a convergent beam, a rotating polygonal mirror having at least a first reflecting face for deflecting said convergent beam and a second reflecting face, and transmission optics having a lens, with which the optical beam deflected by said first reflecting face is incident on said second reflecting face, with the optical beam incident on said second reflecting face being deflected therefrom to produce a scanning optical beam which scans a predetermined surface to be scanned;

wherein said convergent optical beam forms a focused image at a point located between said first reflecting face and said lens in said transmission optics; and wherein during a time period for which said scanning optical beam scans over a predetermined region, the geometric size of said second reflecting face minus wo' is adjusted to be greater than the geometric size of said first reflecting face minus wi' and E, where:

wi' is a maximum value which the diameter of said convergent optical beam as measured in a respective plane crossing the angle of rotation of said rotating polygonal mirror at right angles, takes when said optical beam is incident on said first reflecting face, wo' is a maximum value which the diameter of the optical beam from said transmission optics, as measured in a respective plane crossing the angle of rotation of said rotating polygonal mirror at right angles, takes when said optical beam is incident on said second reflecting face, and E is the distance over which said convergent optical beam moves on said first reflecting face during the time period for which said scanning optical beam scans over a predetermined region.

7. An optical scanner comprising:

a light source, beam shaping optics for transforming an optical beam from said light source into a predetermined shaped optical beam;

a rotating polygonal mirror having at least a first reflecting face for deflecting said shaped optical beam and a second reflecting face, and transmission optics with which the optical beam deflected by said first reflecting face is allowed to be incident on the second reflecting face, the optical beam incident on the second reflecting face being deflected therefrom to produce a scanning optical beam which scans a predetermined surface to be scanned;

wherein during the time period for which said scanning optical beam scans over a predetermined region the following expression is satisfied:

W−wo'>W−wi'−E, where:

W is the geometric size of the reflecting face of said rotating polygonal mirror, wi' is a maximum diameter of said shaped optical beam along said first reflecting face measured in the main scanning cross section when said shaped optical beam is incident on said first reflecting face, wo' is a maximum diameter of the optical beam from said transmission optics along said second reflecting face measured in the main scanning cross section when said optical beam is incident on said second reflecting face, and E is the distance over which said shaped optical beam moves on said first reflecting face during the time period for which said scanning optical beam scans over a predetermined range.

8. The optical scanner according to claim 7, wherein the angle at which said shaped optical beam is incident on said first reflecting face when said scanning optical beam scans near the center of said predetermined range is perpendicular to said first reflecting face in the main scanning plane.

9. The optical scanner according to claim 7, wherein the angle at which the optical beam emerging from said transmission optics is incident on said second reflecting face when said scanning optical beam scans near the center of said predetermined range is perpendicular to said second reflecting face in the main scanning plane.

10. An optical scanner according to claim 7, wherein said light source is a semiconductor laser which emits visible laser light at a wavelength no longer than 700 nm.

* * * * *